US008036808B2

(12) United States Patent
Mori

(10) Patent No.: US 8,036,808 B2
(45) Date of Patent: Oct. 11, 2011

(54) IGNITION CONTROL SYSTEM FOR INTERNAL COMBUSTION ENGINE

(75) Inventor: Sachio Mori, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/981,827

(22) Filed: Dec. 30, 2010

(65) Prior Publication Data

US 2011/0168145 A1 Jul. 14, 2011

Related U.S. Application Data

(63) Continuation of application No. PCT/JP2010/050180, filed on Jan. 8, 2010.

(51) Int. Cl.
*G06F 19/00* (2006.01)
*H01T 13/26* (2006.01)
*H01T 13/20* (2006.01)

(52) U.S. Cl. ........... 701/102; 123/169 EL; 123/169 EA; 313/125; 313/141

(58) Field of Classification Search .............. 123/169 R, 123/169 EA, 169 EL; 701/101, 102, 114; 313/118, 125, 126, 141
See application file for complete search history.

(56) References Cited

U.S. PATENT DOCUMENTS

| | | | | |
|---|---|---|---|---|
| 2,650,584 | A * | 9/1953 | Berstler | 313/125 |
| 3,320,461 | A * | 5/1967 | Feins | 313/125 |
| 4,046,127 | A * | 9/1977 | Almquist et al. | 123/169 EA |
| 4,906,889 | A * | 3/1990 | Dibert | 313/126 |
| 5,555,862 | A | 9/1996 | Tozzi | |
| 5,619,959 | A | 4/1997 | Tozzi | |
| 7,615,914 | B2 * | 11/2009 | Francesconi et al. | 313/141 |
| 2008/0074025 | A1 * | 3/2008 | Hori | 313/141 |

FOREIGN PATENT DOCUMENTS

| | | |
|---|---|---|
| JP | 9-317621 | 12/1997 |
| JP | 2000-291519 | 10/2000 |
| JP | 2001-280229 | 10/2001 |
| JP | 2006-183577 | 7/2006 |
| JP | 2008-101585 | 5/2008 |
| JP | 2009-91937 | 4/2009 |
| JP | 2009-176503 | 8/2009 |
| WO | WO 9502266 A1 * | 1/1995 |
| WO | WO 2009/131134 A1 | 10/2009 |

OTHER PUBLICATIONS

International Search Report issued Apr. 6, 2010 in PCT/JP2010/050180 filed Jan. 8, 2010.

* cited by examiner

*Primary Examiner* — Willis Wolfe, Jr.
(74) *Attorney, Agent, or Firm* — Oblon, Spivak, McClelland, Maier & Neustadt, L.L.P.

(57) ABSTRACT

An object of the present invention is to enable the convergence of the discharge path length of an ignition plug to a target value irrespective of the condition in a cylinder in an ignition control system for an internal combustion engine equipped the ignition plug that can change the discharge path length. To achieve the object, in the present invention, in an ignition control system for an internal combustion engine equipped with a changing device that changes the path length (or discharge path length) of a spark discharge occurring in the discharge gap of the ignition plug, an actual discharge path length or the path length of a spark discharge that actually occurs in the discharge gap is detected, and the changing device is controlled in such a way that the detected actual discharge path length converges to a target discharge path length.

14 Claims, 22 Drawing Sheets

IGNITION CONTROL SYSTEM FOR INTERNAL COMBUSTION ENGINE

CROSS-REFERENCES TO RELATED APPLICATIONS

This application is a continuation of Application, filed under 35 U.S.C. §111(a) of International Application PCT/JP2010/050180, filed Jan. 8, 2010, the contents of which are herein wholly incorporated by reference.

TECHNICAL FIELD

The present invention relates to a technology of controlling ignition of a spark ignition internal combustion engine.

BACKGROUND ART

Patent document 1 discloses a technology in which, in an internal combustion engine equipped with an ignition plug that can change the location (or length) of an arc (or an electric discharge path) generated in the discharge gap by generating a magnetic field in the discharge gap, the length of the arc is made shorter when the engine load is high, and the length of the arc is made longer when the engine load is low.

Patent document 2 discloses a technology in which, in an internal combustion engine equipped with means for detecting combustion ions (ions generated by combustion) present in the discharge gap of an ignition plug, a determination as to whether or not fuel is ignited is made based on the result of detection of combustion ions, and electrical energy supplied to the ignition plug is adjusted in accordance with the result of discrimination.

Patent document 3 discloses a technology in which the length of time over which electric power is supplied to a ignition plug is changed in accordance with the engine operation state of an internal combustion engine.

Prior Art Documents

Patent Documents

Patent Document 1: Japanese Patent Application Laid-Open No. 09-317621

Patent Document 2: Japanese Patent Application Laid-Open No. 2001-280229

Patent Document 3: Japanese Patent Application Laid-Open No. 2000-291519

DISCLOSURE OF THE INVENTION

Problem to be Solved by the Invention

The path of spark discharge (or discharge path) formed in the space between the center electrode and the ground electrode of an ignition plug (i.e. in the discharge gap) changes depending on the condition (with respect to, for example, flow speed or fuel content) of the gas existing in or in the vicinity of the discharge gap. Therefore, if the discharge path length is changed using the engine load as a parameter as described in the aforementioned patent document 1, the actual discharge path length does not converge to a target value in some cases. This problem and a solution thereof are not disclosed nor suggested in the aforementioned patent documents 2 and 3.

The present invention has been made in view of the various situations described above, and an object thereof is to provide a technology that enables the convergence of the discharge path length of an ignition plug to a target value irrespective of the condition in a cylinder in an ignition control system for an internal combustion engine equipped with a device that can change the discharge path length of the ignition plug.

Means for Solving the Problem

To solve the above described problems, according to the present invention, in an ignition control system for an internal combustion engine equipped with a changing device that changes the path length (or discharge path length) of a spark discharge occurring in the discharge gap of the ignition plug, an actual discharge path length or the path length of a spark discharge that actually occurs in the discharge gap is detected, and the changing device is controlled in such a way that the detected actual discharge path length converges to a target discharge path length.

Specifically, an ignition control system for an internal combustion engine according to the present invention comprises:

an ignition plug having a center electrode and a ground electrode disposed in a cylinder of an internal combustion engine;

a changing device that changes a discharge path length, which is the path length of a spark discharge that occurs between said center electrode and said ground electrode;

detection unit for detecting an actual discharge path length, which is the path length of a spark discharge that actually occurs between said center electrode and said ground electrode; and control unit for controlling said changing device in such a way that the actual discharge path length detected by said detection unit converges to a target value.

The actual discharge path length changes depending on the condition of the gas in and in the vicinity of the space between the center electrode and the ground electrode (which space will be hereinafter referred to as the "discharge gap") in some cases. For example, the actual discharge path length tends to be larger when the flow speed of the gas is high than when the flow speed of the gas is low. Furthermore, a situation (or discharge interruption) in which spark discharge from the center electrode does not reach the ground electrode is less prone to occur when the quantity of fuel contained in the gas is large than when the quantity of fuel contained in the gas is small. Therefore, even if the changing device is controlled with a target value, there is a possibility that the actual discharge path length will not converge to the target value in some conditions of the gas.

In the ignition control system for an internal combustion engine according to the present invention, if the actual discharge path length deviates from the target value by a large extent during a discharge period of the ignition plug, the changing device is controlled in such a way that the actual discharge path length converges to the target value. For example, if the actual discharge path length is shorter than the target value, the changing device is controlled in such a way that the actual discharge path length is increased, and if the actual discharge path length is longer than the target value, the changing device is controlled in such a way that the actual discharge path length is decreased. In consequence, the actual discharge path length of the ignition plug is stabilized at the target value irrespective of the condition in the cylinder.

The larger the discharge gap is, the higher the voltage applied to the ignition plug during the discharge (discharge voltage) tends to be. For this reason, it can be said that the longer the actual discharge path length is, the higher the discharge voltage is. Therefore, the detection unit may calculates the actual discharge path length using as an argument the discharge voltage or may use the discharge voltage as a value representing the actual discharge path length.

The ignition control system for an internal combustion engine according to the present invention may further comprise correction unit for correcting the target value of the discharge path length using as a parameter at least one of the quantity of fuel contained in the gas in the cylinder and the quantity of EGR gas in the cylinder.

It is preferred that the target value of the discharge path length be made larger when the engine load is low than when the engine load is high. However, when the quantity of fuel contained in the gas in the cylinder is small, a discharge interruption is more prone to occur than when the quantity of fuel is large. Therefore, by correcting the target value of the discharge path length in accordance with the quantity of fuel contained in the gas in the cylinder, the actual discharge path length can be made longer while preventing discharge interruption from occurring.

When the quantity of EGR gas in the gas existing in the cylinder is large, a discharge interruption is more prone to occur than when the quantity of EGR gas is small. Therefore, by correcting the target value of the discharge path length in accordance with the quantity of EGR gas existing in the cylinder, the actual discharge path length can be made longer while preventing discharge interruption from occurring. The correction unit may use the EGR rate or the opening degree of the EGR valve as a value representing the quantity of EGR gas existing in the cylinder.

The correction unit may correct the target value using as parameters the electrical current (discharge current) and the voltage (discharge voltage) that are applied to the ignition plug at the time when the ignition plug starts the spark discharge.

At the time when the ignition plug starts a spark discharge, in other words at the time when the spark discharge from the center electrode reaches the ground electrode, the spark discharge is hard to be influenced by gas. Consequently, at the time when the ignition plug starts a spark ignition, the amount of extension of the discharge path is substantially zero. Therefore, the discharge voltage and the discharge current at the time when the ignition plug starts a spark ignition correlates with the electrical resistance of the gas existing in the discharge gap ([resistance]=[discharge voltage]/[discharge current]).

The electrical resistance of the gas that exists in the discharge gap tends to be larger when the quantity of fuel is small than when the quantity of fuel is large. Furthermore, the electrical resistance of the gas that exists in the discharge gap tends to be larger when the quantity of EGR gas is large than when the quantity of EGR gas is small.

If the target value is corrected using as parameters the discharge voltage and the discharge current at the time when the ignition plug starts the spark ignition, the corrected target value is adapted to the actual fuel quantity and the actual EGR gas quantity. Therefore, if the changing device is controlled according to the corrected target value, the actual discharge path length can be adjusted to a length adapted to the actual fuel quantity and the actual EGR gas quantity.

The method of correcting the target value in accordance with the electrical resistance of the gas existing in the discharge gap is effective when the internal combustion engine is in a transitional operation state. When the internal combustion engine is in a transitional operation state, since the condition of the gas in the cylinder (e.g. the quantity of EGR gas and the quantity of residual gas (or internal EGR gas)) changes rapidly, it is difficult to accurately determine the quantity of fuel and the quantity of EGR gas existing in and in the vicinity of the discharge gap.

On the other hand, the electrical resistance of the gas existing in the discharge gap correlates with the actual fuel quantity and the actual EGR quantity. Therefore, if the target value is corrected based on the electrical resistance of the gas existing in the discharge gap, the target value is adjusted to a value adapted to the actual fuel quantity and the actual EGR quantity even when the internal combustion engine is in a transitional operation state.

In the present invention, the method of controlling the changing device may be controlling the changing device using as a parameter the difference between the actual discharge path length and the target value, more specifically, controlling the changing device in such away that the actual discharge path length is decreased when the actual discharge path is longer than the target value and that the actual discharge path length is increased when the actual discharge path is shorter than the target value.

There is a possibility that the condition of the gas in and in the vicinity of the discharge gap changes during the discharge period. As the condition of the gas changes, the actual discharge path length also changes. Therefore, if the changing device is controlled according to the above-described method, there is a possibility that it takes time for the actual discharge path length to converge to the target value.

In view of this, the ignition control system for an internal combustion engine according to the present invention may detect (or determine) the change in the actual discharge path length in addition to the actual discharge path length and control the changing device using as parameters the actual discharge path length and the change in the actual discharge path length. If this is the case, a control value for the changing device may be obtained by calculating the sum of the difference between the actual discharge path length and the target value multiplied by a first weighting coefficient and the change in the actual discharge path length multiplied by a second weighting coefficient.

As described above, by controlling the changing device taking into account the actual discharge path length and the change in the actual discharge path length, it is possible to cause the actual discharge path length to converge to the target value quickly even when the condition of gas changes during the discharge period of the ignition plug. The speed of change in the condition of the gas is higher when the speed (engine speed) of the internal combustion engine is high than when the speed of the internal combustion engine is low. Therefore, the ratio of the second weighting coefficient to the first weighting coefficient may be made higher when the engine speed is high than when the engine speed is low. With this method, the actual discharge path length converges quickly to the target value even in situations in which the condition of the gas changes rapidly during the discharge period of the ignition plug.

The changing device according to the present invention may be a device that can change the direction in which the discharge path is extended as well as the discharge path length. The device as such may be an electromagnet that generates a magnetic field in the discharge gap of the ignition plug when an excitation current is supplied to it. The electromagnet can reverse the direction of the magnetic field by reversing the direction of flow of the excitation current. As the direction of the magnetic field generated in the discharge gap changes, the direction in which the discharge path is extended also changes.

The process of changing the direction in which the discharge path is extended may be performed once or a plurality of times during one discharge period. If this is the case, the fuel combustion speed is increased because the contact locations (or the contact area) of the spark discharge and the gas in the cylinder increase.

The process of changing the direction in which the discharge path is extended may performed in accordance with whether or not the engine load is a full load. For example, when the engine load is not a full load, the discharge path may be extended in the direction of the gas flow in the cylinder (i.e. the direction in which the gas in and in the vicinity of the discharge gap flows), and when the engine load is a full load, the discharge path may be extended in the direction opposite to the direction of the gas flow in the cylinder.

The discharge path is extended significantly by the gas flow. Therefore, when the engine load is not a full load, the actual discharge path length can be caused to converge to the target value while reducing the power consumption in the changing device by extending the discharge path in the direction of the gas flow by the changing device.

On the other hand, when the engine load is a full load, there is a possibility that fuel in the region opposite to the region toward which the gas flows self-ignites before the flame propagates to the region opposite to the region toward which the gas flows. If the direction in which the discharge path is extended is changed to the direction opposite to the direction of the gas flow, the time at which the flame propagates to the region opposite to the region toward which the gas flows can be made earlier. Consequently, self-ignition of fuel existing in the region opposite to the region toward which the gas flows can be prevented from occurring.

The ignition plug according to the present invention may have a plurality of ground electrodes. If this is the case, the plurality of ground electrodes should be arranged along the direction in which the discharge path is extended by the changing device. In other word, the changing device is adapted to be able to change the discharge path length along the direction of arrangement of the plurality of ground electrodes.

With this feature, the electrode to which the spark discharge is grounded can be switched by the changing device while changing the actual discharge path length. Furthermore, after the switching of the ground electrode, the energy needed for the changing device to extend the discharge path can be made smaller.

In cases where an electromagnet is used as the changing device, if the electric potential of the electromagnet is equal to or lower than the electric potential of the ground electrode of the ignition plug, there is a possibility that the spark ignition is grounded to the electromagnet. In view of this, it is desirable that the electric potential of the electromagnet be made higher than the ground electrode.

In cases where an electromagnet is used as the changing device according to the present invention, a capacitor may be provided in a line (which will be hereinafter referred to as the "excitation current line") for supplying excitation current to the electromagnet. If the actual discharge path length changes at a time when the electromagnet is in a non-energized state, a current may sometimes be generated in the excitation current line by electromagnetic induction.

If a capacitor is provided in the excitation current line, the electrical energy generated by electromagnetic induction can be stored in the capacitor. The electrical energy stored in the capacitor can be used to energize the electromagnet. Therefore, the power consumption of the electromagnet can be reduced.

The present invention can be applied to a port-injection type internal combustion engine that is equipped with a fuel injection valve that injects fuel into an intake passage and to a cylinder-injection type internal combustion engine that is equipped with a fuel injection valve that injects fuel into a cylinder.

In the case of the cylinder-injection type internal combustion engine, the direction in which the discharge path is extended and the amount of extension of the discharge path may be changed along the direction in which the fuel injected by the fuel injection valve travels. This is advantageous in cases where the fuel injection timing is retarded to a time close to the ignition time as is the case when the exhaust temperature of the internal combustion engine is raised.

If the direction in which the discharge path is extended and the amount of extension of the discharge path are changed along the direction in which the fuel injected by the fuel injection valve travels, the discharge path shifts with the shift or travel of the fuel injected by the fuel injection valve. Specifically, in the early stage in the discharge period, the discharge path is extended to the neighborhood of the injection port of the injection valve, and thereafter the discharge path is extended in the direction in which the fuel travels.

This manner of shift of the discharge path enhances the ignitability of fuel, thereby decreasing the quantity of unburned fuel discharge from the cylinder. Consequently, a further rise in the exhaust temperature and a reduction in the exhaust emissions can be achieved.

An ignition control system for an internal combustion engine according to the present invention may comprise:

an ignition plug having a center electrode and a ground electrode disposed in a cylinder of an internal combustion engine;

a changing device that changes a discharge path length, which is the path length of a spark discharge that occurs between said center electrode and said ground electrode;

determination unit for determining (or setting) a target value of the discharge path length based on a parameter correlating with the condition of the gas in the cylinder; and control unit for controlling said changing device according to the target value determined by said determination unit.

Thus, the control unit may perform only a feed-forward control without performing a feedback control of the changing device. If this is the case, at least one of the fuel injection quantity, the EGR gas quantity and the engine speed may be used as the parameter correlating with the condition of the gas in the cylinder.

For example, the determination unit may make the target value smaller when the fuel injection quantity is small or the EGR gas quantity is large than when the fuel injection quantity is large or the EGR gas quantity is small. If the target value is determined in this way, a discharge interruption can be prevented from occurring. Alternatively, the determination unit may make the target value smaller when the engine speed is high than when the engine speed is low. If the target value is determined in this way, situations in which the actual discharge path length becomes unduly long while the engine speed is high (i.e. when the gas flow speed is high) and situations in which the actual discharge path length becomes unduly short while the engine speed is low (i.e. when the gas flow speed is low) can be prevented from occurring.

Effects of the Invention

According to the present invention, in an ignition control system for an internal combustion engine that can change the path length of a spark discharge that occurs in the discharge gap of an ignition plug, the discharge path length of the ignition plug can converge to a target value irrespective of the condition in a cylinder.

THE BEST MODE FOR CARRYING OUT THE INVENTION

In the following, specific embodiments of the present invention will be described with reference to the drawings. The dimensions, materials, shapes and relative arrangements etc. of the components that will be described in connection with the embodiments are not intended to limit the technical scope of the present invention only to them, unless particularly stated.

First Embodiment

Figure 1:
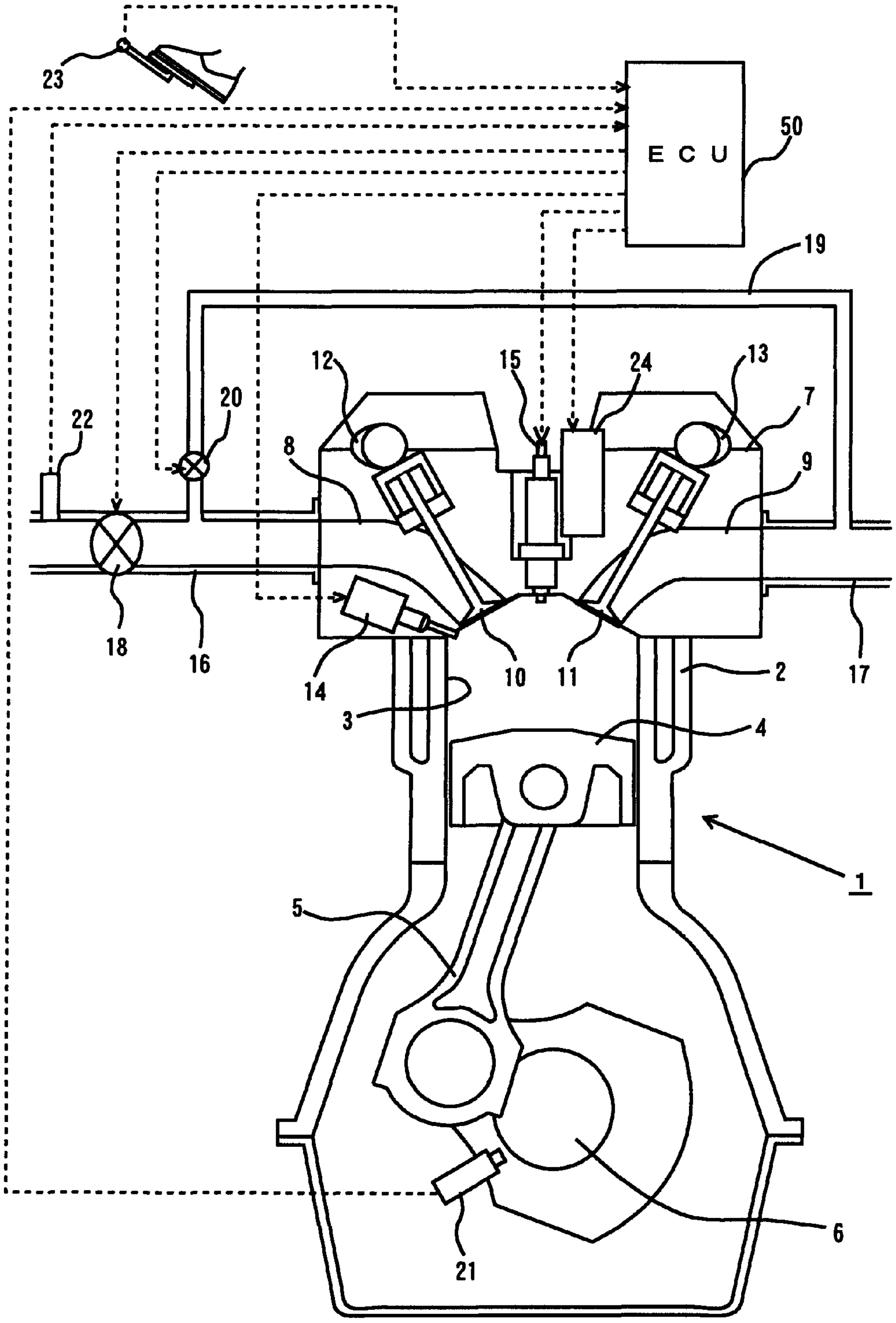
FIG. 1 is a diagram showing the basic configuration of an internal combustion engine to which the present invention is applied.

A first embodiment of the present invention will be described with reference to FIGS. 1 to 8. FIG. 1 is a diagram showing the basic configuration of an internal combustion engine to which the present invention is applied. The internal combustion engine 1 shown in FIG. 1 is a spark ignition internal combustion engine (gasoline engine) having a plurality of cylinders 3. In FIG. 1, only one cylinder 3 among the plurality of cylinders is illustrated.

A cylinder block 2 of the internal combustion engine defines the cylinder 3. In the cylinder 3 is provided a piston 4, which can slide along the cylinder axis. The piston 4 is connected to a crankshaft 6 via a connecting rod 5.

A cylinder head 7 of the internal combustion engine 1 is provided with an intake port 8 and an exhaust port 9. The open end of the intake port 8 and the open end of the exhaust port 9 in the cylinder 3 are opened and closed by an intake valve 10 and an exhaust valve 11 respectively. The intake valve 10 and the exhaust valve 11 are driven for opening and closing respectively by an intake cam 12 and an exhaust cam 13 that are rotatably supported on the cylinder head 7.

A fuel injection valve 14 that injects fuel into the cylinder 3 and an ignition plug 15 that causes a spark discharge in the cylinder 3 are mounted on the cylinder head 7. A changing device 24 that changes the path length of the spark discharge is attached to the ignition plug 15 or the cylinder head 7 in the vicinity of the ignition plug 15.

The internal combustion engine 1 is connected with an intake passage 16, which is in communication with the aforementioned intake port 8, and an exhaust passage 17, which is in communication with the aforementioned exhaust port 9. A throttle valve 18 that changes the channel cross sectional area of the intake passage 16 is provided in the middle of the intake passage 16. The portion of the intake passage 16 downstream of the throttle valve 18 and the exhaust passage 17 are in communication with each other through an EGR passage 19. An EGR valve 20 that changes the channel cross sectional area of the EGR passage 19 is provided in the middle of the EGR passage 19.

Figure 2:
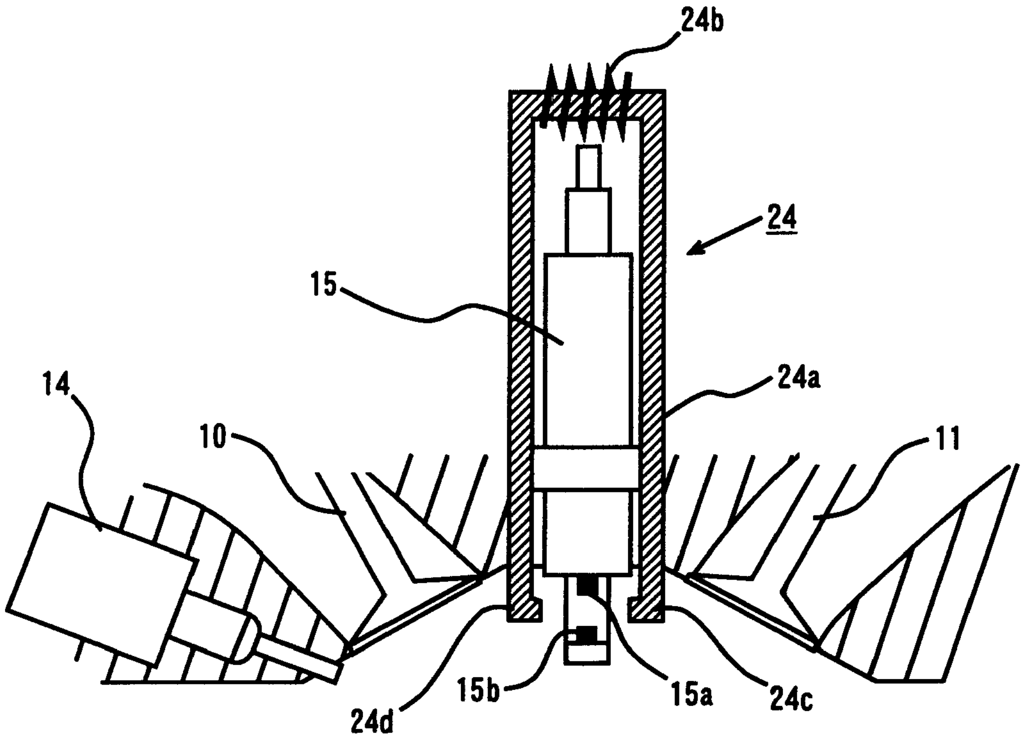
FIG. 2 is a diagram showing the structure of a changing device.

Now, the structure of the aforementioned changing device 24 will be described with reference to FIG. 2. The changing device 24 shown in FIG. 2 is an electromagnet having a substantially U-shaped core 24*a* and a coil 24*b* wound around the core 24*a*. The base end 24*c* and the tip end 24*d* of the core 24*a* are sticking out into the cylinder 3. The core 24*a* should be disposed in such a way that a virtual straight line connecting the base end 24*c* and the tip end 24*d* of the core 24*a* intersects (for example at a right angle) with a virtual straight line connecting a center electrode 15*a* and a ground electrode 15*b* of the ignition plug 15.

In the changing device 24 having the above-described structure, as an excitation current is supplied to the coil 24*b*, a magnetic force is generated between the base end 24*c* and the tip end 24*d*. The magnetic force generated between the base end 24*c* and the tip end 24*d* bends the spark discharge occuring between the center electrode 15*a* and the ground electrode 15*b* of the ignition plug 15 (i.e. in the discharge gap).

Figure 3:
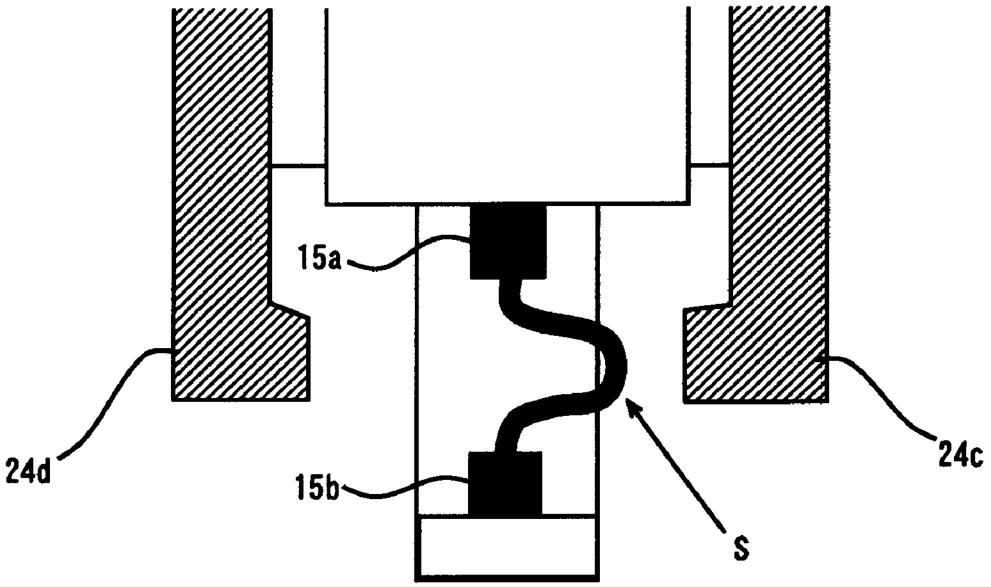
FIG. 3 is a diagram showing a discharge path extended by the changing device.

For example, in a case in which a magnetic force acts in the direction from the tip end 24*d* to the base end 24*c*, the spark discharge S is bent toward the tip end 24*d* as shown in FIG. 3. When the spark discharge is bent in this way, the path length of spark discharge (or the discharge path length) is longer than when the spark discharge is not bent. In connection with this, the discharge path length of the ignition plug 15 can be changed by changing the amount of excitation current supplied to the coil 24*b*.

An increase in the discharge path length as described above can lead to a shift in the location of grounding of the spark discharge from the ground electrode 15*b* to the core 24*a*. In view of this, the electric potential of the core 24*a* should be made higher than the ground electrode 15*b* of the ignition plug 15. An exemplary method of making the electric potential of the core 24*a* higher than that of the ground electrode 15*b* is insulating the ground electrode 15*b* and the core 24*a* from each other and applying a low voltage on the ground electrode 15*b*.

Although the core 24*a* used in the case shown in FIG. 2 is substantially U-shaped, it may have any shape as long as a magnetic force (or magnetic field) is generated in the discharge gap of the ignition plug 15.

Returning to FIG. 1, an electronic control unit (ECU) 50 is annexed to the internal combustion engine 1. The ECU 50 is an electronic control unit composed of a CPU, ROM, RAM and backup RAM etc. The ECU 50 is electrically connected with various sensors such as a crank position sensor 21, an air flow meter 22 and an accelerator position sensor 23.

The crank position sensor 21 is a sensor provided in the neighborhood of the crankshaft 6 to output an electrical signal correlating with the rotational position of the crankshaft 6. The air flow meter 22 is a sensor provided in the intake passage 16 upstream of the throttle valve 18 to output an electrical signal correlating with the quantity of air flowing in the intake passage 16. The accelerator position sensor 23 is a sensor that outputs an electrical signal correlating with the operation amount of the accelerator pedal (or accelerator opening degree).

Various devices such as the fuel injection valve 14, the ignition plug 15, the throttle valve 18, the EGR valve 20 and the changing device 24 are also electrically connected to the ECU 50. The ECU 50 controls the aforementioned various devices based on signals input from the aforementioned various sensors.

For example, the ECU 50 controls the changing device 24 in such a way that the discharge path length of the ignition plug 15 becomes a length adapted to the operation state of the internal combustion engine 1. (This control will be hereinafter referred to as "discharge control".) In the following, the method of executing the discharge control in this embodiment will be described.

The ECU 50 first determines (or sets) a target value of the discharge path length based on the operation state of the internal combustion engine 1. It is preferred that the target value of the discharge path length be determined in such a way that it becomes larger when there might occur a large delay in the fuel ignition or when the flame propagation speed is low.

Figure 4:
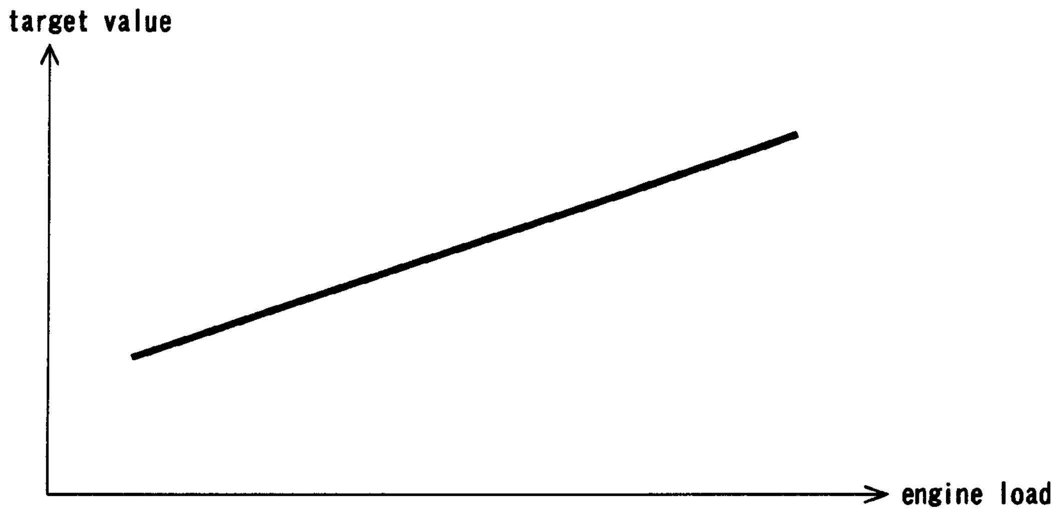
FIG. 4 is a graph schematically showing a map that defines the relationship between the target value of the discharge path length and the engine load.

A large fuel ignition delay or a low flame propagation speed might occur, for example, when the load (engine load) of the internal combustion engine 1 is low. Therefore, the ECU 50 may set the target value according to a map like that shown in FIG. 4. FIG. 4 is a schematic graph of a map that specifies the relationship between the engine load and the target value. In the case shown in FIG. 4, a larger target value is set when the engine load is low than when the engine load is high.

Even if the engine load is the same, the actual discharge path length can change depending on the quantity of EGR gas introduced into the cylinder 3. For example, the actual discharge path length can be shorter when the EGR gas quantity is large than when the EGR gas quantity is small.

In view of this, the ECU 50 is adapted to correct the target value set as a function of the engine load, based on the EGR gas quantity. For example, the ECU 50 makes the target value smaller when the EGR gas quantity is larger than a proper quantity and makes the target value larger when the EGR gas quantity is smaller than the proper quantity. The proper quantity mentioned here is an EGR gas quantity with which the above-described relationship between the target value and the engine load shown in FIG. 4 holds. The ECU 50 may correct the target value using as a parameter the EGR rate or the opening degree of the EGR valve 20 instead of the EGR gas quantity.

When the quantity of fuel in the cylinder 3 is small, a situation (or discharge interruption) in which spark discharge from the center electrode 15*a* does not reach the ground electrode 15*b* is more prone to occur than when the quantity of fuel in the cylinder 3 is large. Therefore, if a large target value is set when the fuel quantity is small, there is a possibility that a discharge interruption occurs.

In view of this, the ECU 50 is adapted to correct the target value set as a function of the engine load, based on the fuel injection quantity. For example, the ECU 50 makes the target value smaller when the fuel injection quantity is smaller than a proper quantity and makes the target value larger when the fuel injection quantity is larger than the proper quantity. The proper quantity mentioned here is a fuel injection quantity with which the above-described relationship between the target value and the engine load shown in FIG. 4 holds. The ECU 50 may correct the target value using as a parameter the air-fuel ratio instead of the fuel injection quantity.

The actual discharge path length of the ignition plug 15 changes depending on the condition of the gas in and in the vicinity of the discharge gap. For example, the actual discharge path length is longer when the velocity (or flow velocity) of the gas flowing in and in the vicinity of the discharge gap is high than when the velocity of the gas is low. Therefore, if the changing device 24 increases the discharge path at a time when the flow velocity of the gas is high, there is a possibility that the actual discharge path length becomes larger than the target value.

Furthermore, when the fuel concentration distribution in the cylinder 3 is uneven, the quantity of fuel in and in the vicinity of the discharge gap can be unduly small. If the changing device 24 increases the discharge path at a time when the quantity of fuel in and in the vicinity of the discharge gap is unduly small, there is a possibility that a discharge interruption occurs.

In view of the above, in the discharge control according to this embodiment, the ECU 50 is adapted to detects (or determines) the actual discharge path length during the discharge period in the ignition plug 15 and to adjust the amount of excitation current supplied to the changing device 24 based on the difference between the actual discharge path length thus detected and the target value. This adjusting process is performed multiple times during one discharge period.

Figure 5:
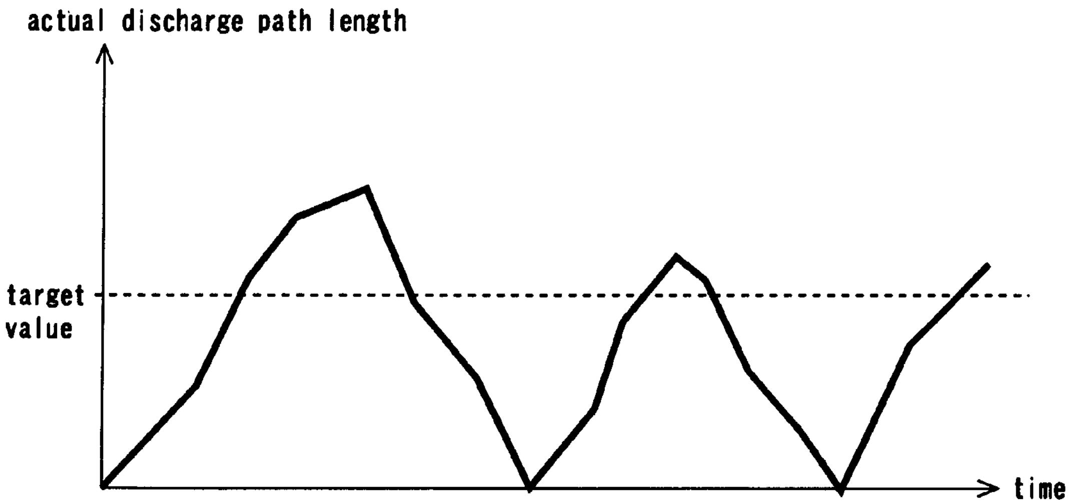
FIG. 5 is a graph showing changes in the actual discharge path length in a case where no discharge control is performed.

The gas flow in and in the vicinity of the discharge gap of the ignition plug 15 can change during the discharge period. Consequently, as shown in FIG. 5, the actual discharge path length during the discharge period may increase or decrease in some cases due to influences of the gas flow. In such cases, if the amount of excitation current is adjusted based on the difference between the actual discharge path length and the target value, there is a possibility that overshoot or undershoot of the actual discharge path length is promoted.

For example, if the changing device 24 is controlled to increase the discharge path length at a time when the actual discharge path length is shorter than the target value and the actual discharge path length tends to increase, there is a possibility that the discharge path length becomes unduly long. Furthermore, if the changing device 24 is controlled to decrease the discharge path length at a time when the actual discharge path length is longer than the target value and the actual discharge path length tends to decrease, there is a possibility that the discharge path length becomes unduly short.

In view of the above, the ECU 50 is adapted to adjust the amount of excitation current using as a parameter the change in the actual discharge path length in addition to the difference between the actual discharge path length and the target value. Specifically, the ECU 50 determines (or sets) the amount of excitation current I according to the following equation:

$$I=C1\cdot(X1-XA)+C2\cdot(X1-X0).$$

Figure 6:
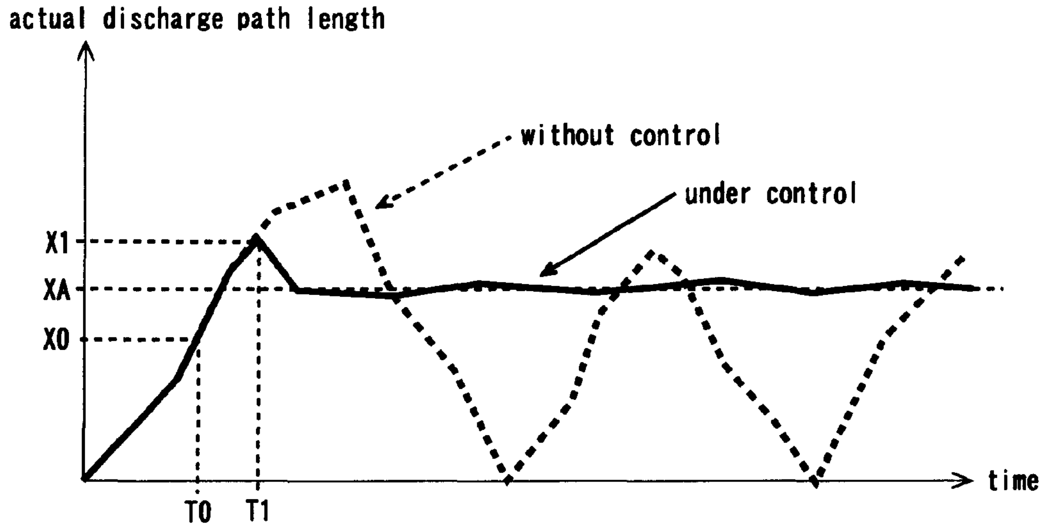
FIG. 6 is a graph showing changes in the actual discharge path length in a case where a discharge control is performed.

In the above equation, X0 and X1 are actual discharge path lengths measured at different times T1 and T2 during the discharge period, XA is the target value of the discharge path length, and C1 and C2 are weighting coefficients, which are determined based on an adaptation process by, for example, experiments. If the amount of excitation current I is adjusted according to the above equation, the actual discharge path length will converge to the target value at an early time in the discharge period, as shown in FIG. 6.

Figure 7:
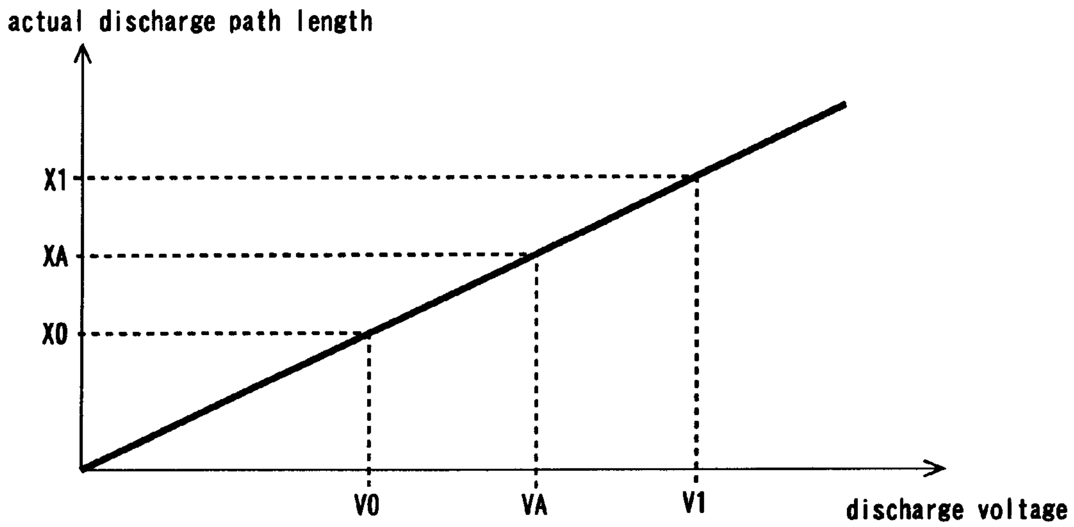
FIG. 7 is a graph showing a correlation between the actual discharge path length and the discharge voltage.

The actual discharge path length is proportional to the voltage (or discharge voltage) applied to the ignition plug 15 during the discharge period, as shown in FIG. 7. Therefore, in the aforementioned adaptation process, the target values XA and the actual discharge path lengths X0, X1 may be replaced by the target discharge voltage VA and the discharge voltages V0, V1 respectively.

Figure 8:
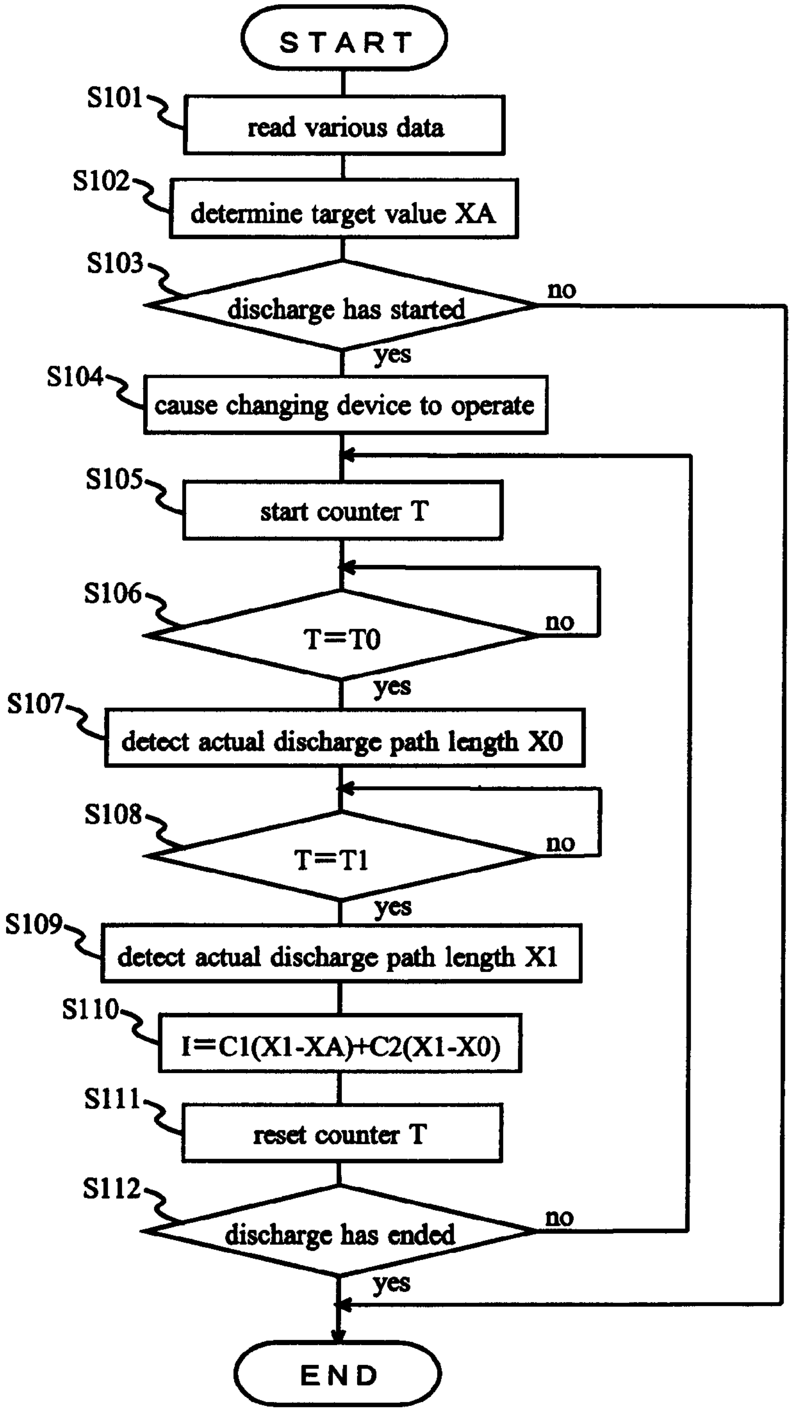
FIG. 8 is a flow chart of a discharge control routine in a first embodiment.

In the following, a process of executing the discharge control in this embodiment will be described with reference to FIG. 8. FIG. 8 is a flow chart of a discharge control routine. The discharge control routine is stored in the ROM of the ECU 50 in advance and executed periodically by the ECU 50.

In the discharge control routine shown in FIG. 8, the ECU 50 reads various data in step S101. In this step, the ECU 50 reads, as parameters needed to determine the target value XA of the discharge path length, the engine load (or a signal output from the accelerator position sensor 23), the fuel injection quantity and a value correlating with the EGR gas quantity (e.g. the EGR rate or the opening degree of the EGR valve 20).

In step S102, the ECU 50 determines the target value XA of the discharge path length, using as parameters various data read in the above step S101. Specifically, the ECU 50 determines the target value XA based on the engine load and the map shown in FIG. 4. Then, the ECU 50 corrects the target value XA using as parameters the fuel injection quantity and the EGR gas quantity. The ECU 50 that executes the process of step S102 embodies the correction unit according to the present invention.

In step S103, the ECU 50 determines whether or not the ignition plug 15 has started a spark discharge. If the determination in step S103 is negative, the ECU 50 once terminates the execution of this routine. On the other hand, if the determination in step S103 is affirmative, the ECU 50 proceeds to step S104.

In step S104, the ECU 50 causes the changing device 24 to operate with the target value XA determined in the above step S102. Subsequently, the ECU 50 proceeds to step S105, where it starts a counter T. The counter T counts the time elapsed since the time at which the ignition plug 15 starts a spark discharge.

In step S106, the ECU 50 determines whether or not the time counted by the counter T is equal to a first predetermined time T0. The first predetermined time T0 is a time set to specify the time at which the aforementioned actual discharge path length X0 is detected. The first predetermined time T0 is very short relative to one discharge period.

If the determination in step S106 is negative, the ECU 50 executes the process of step S106 repeatedly. If the determination in step S106 is affirmative, the ECU 50 proceeds to step S107, where it detects the actual discharge path length X0. In doing so, the ECU 50 may measures the discharge voltage V0 instead of the actual discharge path length X0.

In step S108, the ECU 50 determines whether or not the time counted by the counter T is equal to a second predetermined time T1. The second predetermined time T1 is a time set to specify the time at which the aforementioned actual discharge path length X1 is detected. The second predetermined time T1 is longer than the aforementioned first predetermined time T0.

If the determination in step S108 is negative, the ECU 50 executes the process of step S108 repeatedly. If the determination in step S108 is affirmative, the ECU 50 proceeds to step S109, where it detects the actual discharge path length X1. In doing so, the ECU 50 may measure the discharge voltage V1 instead of the actual discharge path length X1.

In step S110, the ECU 50 calculates the amount of excitation current I by substituting the target value XA determined in the above step S102, the actual discharge path length X0 detected in the above step S107 and the actual discharge path length X1 detected in the above step S109 into the aforementioned equation. Then, the ECU 50 controls the changing device 24 according to the amount of excitation current I. Specifically, the ECU 50 changes the amount of excitation current applied to the changing mechanism 24 into the amount of excitation current I calculated in the above step S110.

In step S111, the ECU 20 stops the counter T, and resets the time count of the counter T to zero. Subsequently, the ECU 50 proceeds to step S112, where it determines whether or not the discharge in the ignition plug 15 has ended. If the determination in step S112 is negative, the ECU 50 executes the processes of the above step S105 and the subsequent steps again. On the other hand, if the determination in step S112 is affirmative, the ECU 50 once terminates the execution of this routine.

The ECU 50 that executes the process of steps S106 through S109 embodies the detection unit according to the present invention. The ECU 50 that executes the process of step S110 embodies the control unit according to the present invention.

In the embodiment described in the foregoing, the actual discharge path length during the discharge in the ignition plug 15 is stabilized at the target value irrespective of the condition in the interior of the cylinder 3. In consequence, the ignition delay can be decreased, and the flame propagation speed can be increased. Furthermore, variations in the ignition delay and variations in the flame propagation speed among cylinders or among cycles can be eliminated. Therefore, variations in the torque generated by the internal combustion engine 1 and variations in the exhaust emissions among cylinders or among cycles can be eliminated.

Second Embodiment

Next, a second embodiment of the present invention will be described with reference to FIG. 9. Here, features different from the above-described first embodiment will be described, and like features will not be described.

What is different in this embodiment from the above-described first embodiment is that the target value XA is corrected based on the electrical resistance of the gas that actually exists in the discharge gap of the ignition plug 15. The method of obtaining the electric resistance of the gas existing in the discharge gap of the ignition plug 15 may be calculating it using as parameters the current (discharge current) and voltage (discharge voltage) applied to the ignition plug 15 at the time when the ignition plug 15 starts a spark discharge.

At the time when the ignition plug 15 starts a spark discharge, in other words, at the time when a spark discharge occurs in the discharge gap of the ignition plug 15, extension of discharge path due to influences of the gas is little. Therefore, the discharge voltage and the discharge current at the time when the ignition plug 15 starts a spark discharge correlate with the electrical resistance of the gas existing in the discharge gap ([resistance]=[discharge voltage]/[discharge current]).

The electrical resistance obtained by the above method tends to be larger when the quantity of fuel existing in the discharge gap is small than when the quantity of fuel is large. Therefore, if the target value XA is corrected based on the electrical resistance, the corrected target value is adapted to the actual fuel quantity. Consequently, by controlling the changing device according to the corrected target value, the actual discharge path length can be adjusted to a length adapted to the actual fuel quantity.

In the following, a process of executing the discharge control in this embodiment will be described with reference to FIG. 9. FIG. 9 is a flow chart of the discharge control routine in this embodiment. In the flow chart of FIG. 9, the processes same as those in the discharge control routine in the above-described first embodiment (see FIG. 8) are denoted by the same reference symbols.

Figure 9:
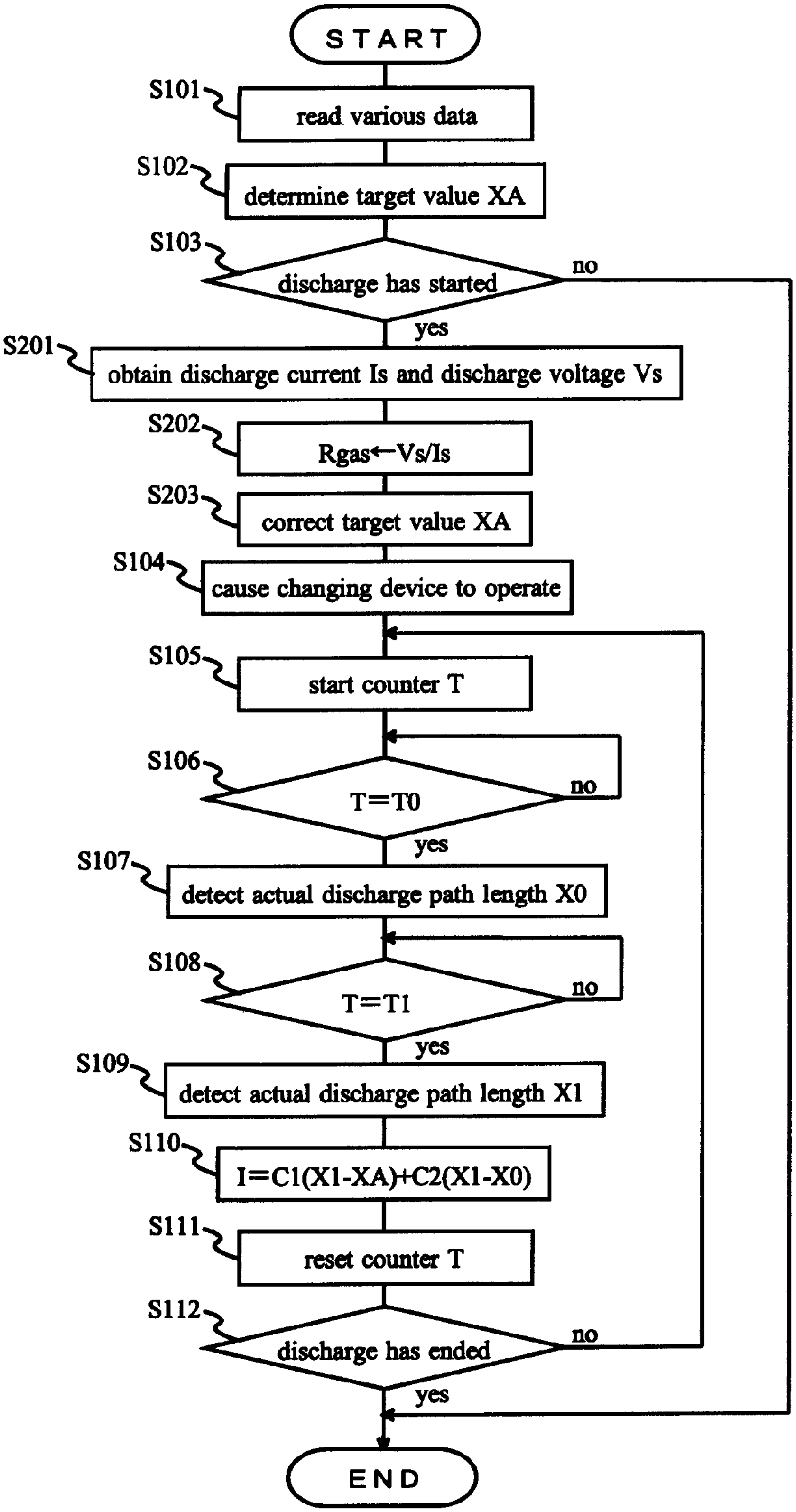
FIG. 9 is a flow chart of a discharge control routine in a second embodiment.

In the discharge control routine of FIG. 9, if the determination in step S103 is affirmative, the ECU 50 executes the processes of steps S201 through S203. First in step S201, the ECU 50 detects the discharge current Is and the discharge voltage Vs applied to the ignition plug 15.

In step S202, the ECU 50 calculates the electrical resistance Rgas of the gas existing in the discharge gap of the ignition plug 15 using as parameters the discharge current Is and the discharge voltage Vs detected in the above step S201 (Rgas=Vs/Is).

In step S203, the ECU50 corrects the target value XA obtained in the above step S102 using as a parameter the electrical resistance Rgas obtained in the above step S202. For example, the ECU 50 decrease the target value XA when the electrical resistance Rgas is larger than a specific value, and increases the target value XA when the electrical resistance is smaller than the specific value. The specific value mentioned here is an electrical resistance with which the relationship between the engine load and the target value in the aforementioned map in FIG. 4 holds.

The target value XA that is corrected in step S203 may be a value obtained from the above-described map shown in FIG. 4 or a value obtained by correcting a value obtained from the map shown in FIG. 4 based on the fuel injection quantity and the EGR gas quantity. The above-described processes of steps S201 through S203 may be executed after the process of step S104 has been executed.

In the embodiment described in the foregoing, the target value XA can be adjusted to a value adapted to the actual condition of the gas even when the condition of the gas existing in the discharge gap is different from an assumed value. In consequence, the actual discharge path length is also adjusted to a length adapted to the actual condition of the gas.

Third Embodiment

A third embodiment will be described with reference to FIGS. 10 and 11. Here, features different from the above-described first embodiment will be described, and like features will not be described.

What is different in this embodiment from the above-described first embodiment is that the direction in which the discharge path is extended is changed during one discharge period in the ignition plug 15. Specifically, the ECU 50 reverses the direction of the current supplied to the coil 24*b* of the changing device 24 at regular intervals. A specific method of changing the direction of the current supplied to the coil 24*b* is reversing the positive/negative signs of the weighting coefficients C1, C2 in the aforementioned equation at regular intervals.

Figure 10:
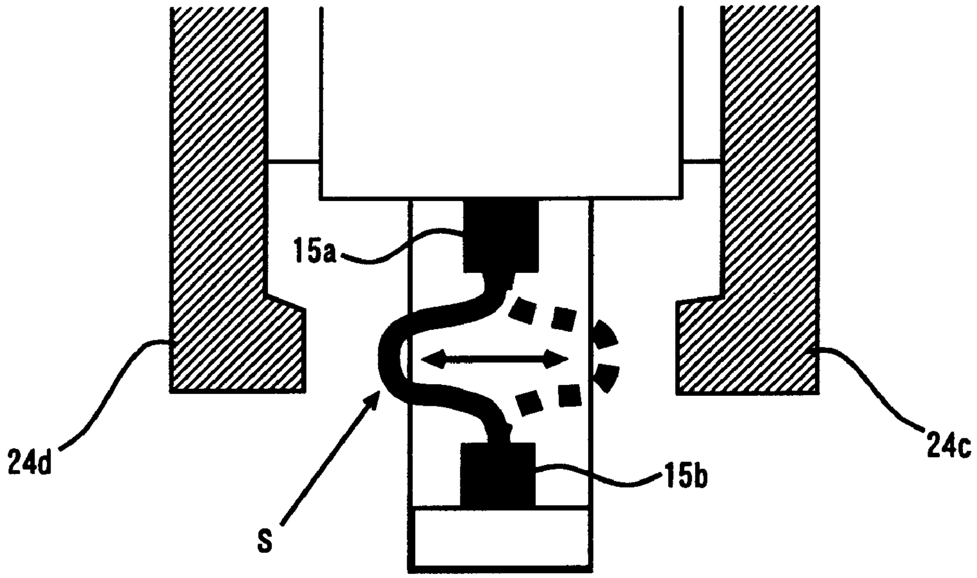
FIG. 10 is a diagram showing the discharge path with its extension direction being changed.

As the direction of the excitation current is reversed by the above method, the direction in which the spark discharge S is extended changes as shown in FIG. 10 at regular intervals. The broken line in FIG. 10 illustrates the spark discharge before the reversal, and the solid light shows the spark discharge after the reversal.

As the direction in which the discharge path is extended is changed during the discharge period in the ignition plug 15, the contact locations (or the contact area) of the spark discharge and the gas increase. Consequently, the fuel ignition delay can be decreased, and the flame propagation speed can be increased.

In the following, the process of executing the discharge control in this embodiment will be described with reference to FIG. 11. FIG. 11 is a flow chart of a subroutine that is executed as an interruption process triggered by the start of a spark discharge by the ignition plug 15. This subroutine is stored in the ROM of the ECU 50 in advance and executed repeatedly at intervals shorter than the discharge period of the ignition plug 15.

Figure 11:
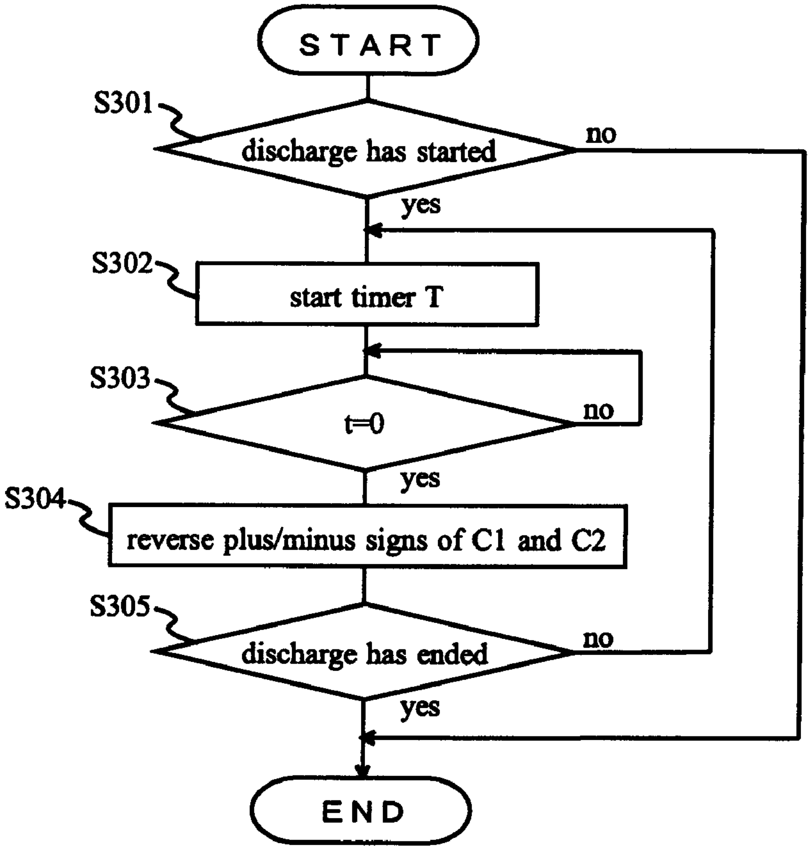
FIG. 11 is a flow chart of a subroutine that is executed as an interruption process triggered by the start of a spark discharge by the ignition plug.

In the subroutine shown in FIG. 11, the ECU 50 determines in step S301 whether or not the ignition plug 15 has started a spark discharge. If the determination in step S301 is negative, the ECU 50 once terminates the execution of this routine. If the determination in step S301 is affirmative, the ECU 50 proceeds to step S302.

In step S302, the ECU 50 starts a timer t. The timer t is a count-down timer that counts an interval of the reversals of the direction in which the discharge path is extended. The aforementioned interval may be either a predetermined fixed value or a variable value that is varied in accordance with the length of the discharge period.

In step S303, the ECU 50 determines whether or not the value of the aforementioned timer t is zero. If the determination in step S303 is negative, the ECU 50 executes the process of step S303 repeatedly. On the other hand, if the determination in step S303 is affirmative, the ECU 50 proceeds to step S304.

In step S304, the ECU 50 reverses the positive/negative signs of the weighting coefficients C1, C2 used in calculating the amount of excitation current I. Then, the ECU 50 proceeds to step S305, where it determines whether or not the discharge period has ended. If the determination in step S305 is negative, the ECU 50 executes the processes of steps S302 through S304 again. On the other hand, if the determination in step S305 is affirmative, the ECU 50 once terminates the execution of this routine.

With the execution of the subroutine shown in FIG. 11 by the ECU 50 as described above, the direction in which the discharge path is extended is reversed periodically during one discharge period. In consequence, the contact area of the spark discharge and the gas increases, thereby making the ignition delay smaller and making the flame propagation speed higher.

If the ignition delay decreases and the flame propagation speed increases as described above, the EGR rate may further be increased. In other words, in cases where the process of reversing the direction in which the discharge path is extended is executed, the EGR rate may be made higher than that in cases where the reversing process is not executed. In consequence, the amount of nitrogen oxide (NOx) emissions can further be decreased without deterioration in the combustion state of the internal combustion engine 1.

Fourth Embodiment

Next, a fourth embodiment will be described with reference to FIGS. 12 to 14. Here, features different from the above-described third embodiment will be described, and like features will not be described.

What is different in this embodiment from the above-described third embodiment is that the direction in which the discharge path is extended is not changed during the discharge period, but it is changed in accordance with the engine load. Specifically, the ECU 50 changes the direction in which the discharge path is extended in accordance with whether or not the engine load is a full load.

The flame generated in the cylinder 3 first propagates along the gas flow from the intake side (i.e. the region near the opening end of the intake port 8) to the exhaust side (i.e. the region near the opening end of the exhaust port 9), and thereafter propagates from the exhaust side to the intake side.

When the engine load is not a full load, the possibility that the pressure in the cylinder 3 (or in-cylinder pressure) and the temperature in the cylinder 3 (or in-cylinder temperature) become as high as the ignition temperature of fuel is low. On the other hand, when the engine load is a full load, the possibility that the in-cylinder pressure and the in-cylinder temperature become as high as the ignition temperature of fuel is high. Therefore, when the engine load is a full load, there is a possibility that fuel in the intake side self-ignites before the flame propagates to the intake side to cause vibrations and noises (i.e. knocking).

Figure 12:
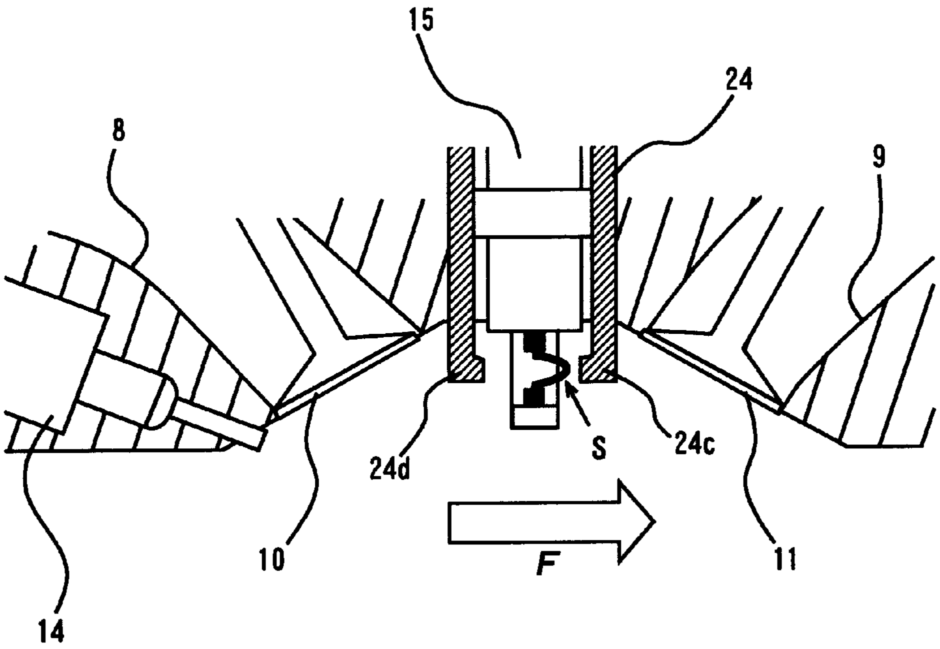
FIG. 12 is a diagram showing a discharge path at a time when the engine load is not a full load.
Figure 13:
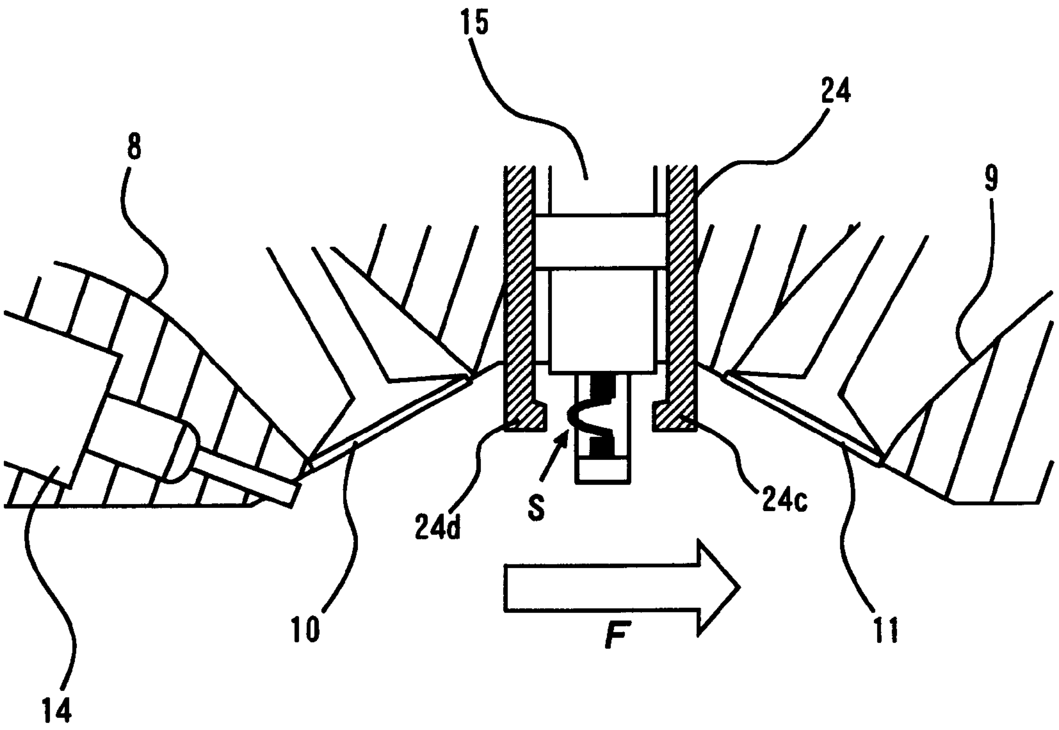
FIG. 13 is a diagram showing a discharge path at a time when the engine load is not a full load.

In view of this, when the engine load is not a full load, the ECU 50 is adapted to control the changing device 24 in such a way that the spark discharge S is extended in the direction of the gas flow (indicated by arrow F in FIG. 12) as shown in FIG. 12. On the other hand, when the engine load is a full load, the ECU 50 is adapted to control the changing mechanism 24 in such a way that the spark discharge S is extended in the direction opposite to the gas flow (indicated by arrow F in FIG. 13) as shown in FIG. 13.

Thus, the ECU 50 is adapted to control the changing device 24 in such a way as to extend the discharge path toward the exhaust side when the engine load is not a full load and to extend the discharge path toward the intake side when the engine load is a full load.

When the engine load is not a full load, since the discharge path is extended significantly by the gas flow, it is possible to cause the actual discharge path length to converge to the target value XA while reducing the amount of excitation current supplied to the changing device 24. In consequence, the flame propagation speed can be increased while reducing the electrical power consumption.

On the other hand, when the engine load is a full load, since the discharge path is extended toward the intake side, the time at which the flame propagates to the intake side can be made earlier. Consequently, the self-ignition of fuel existing in the intake side can be prevented from occurring.

In the following, a process of executing the discharge control in this embodiment will be described with reference to FIG. 14. FIG. 14 is a flow chart of a discharge control routine in this embodiment. In FIG. 14, the processes same as those in the discharge control routine in the above-described first embodiment (see FIG. 8) are denoted by the same reference symbols.

Figure 14:
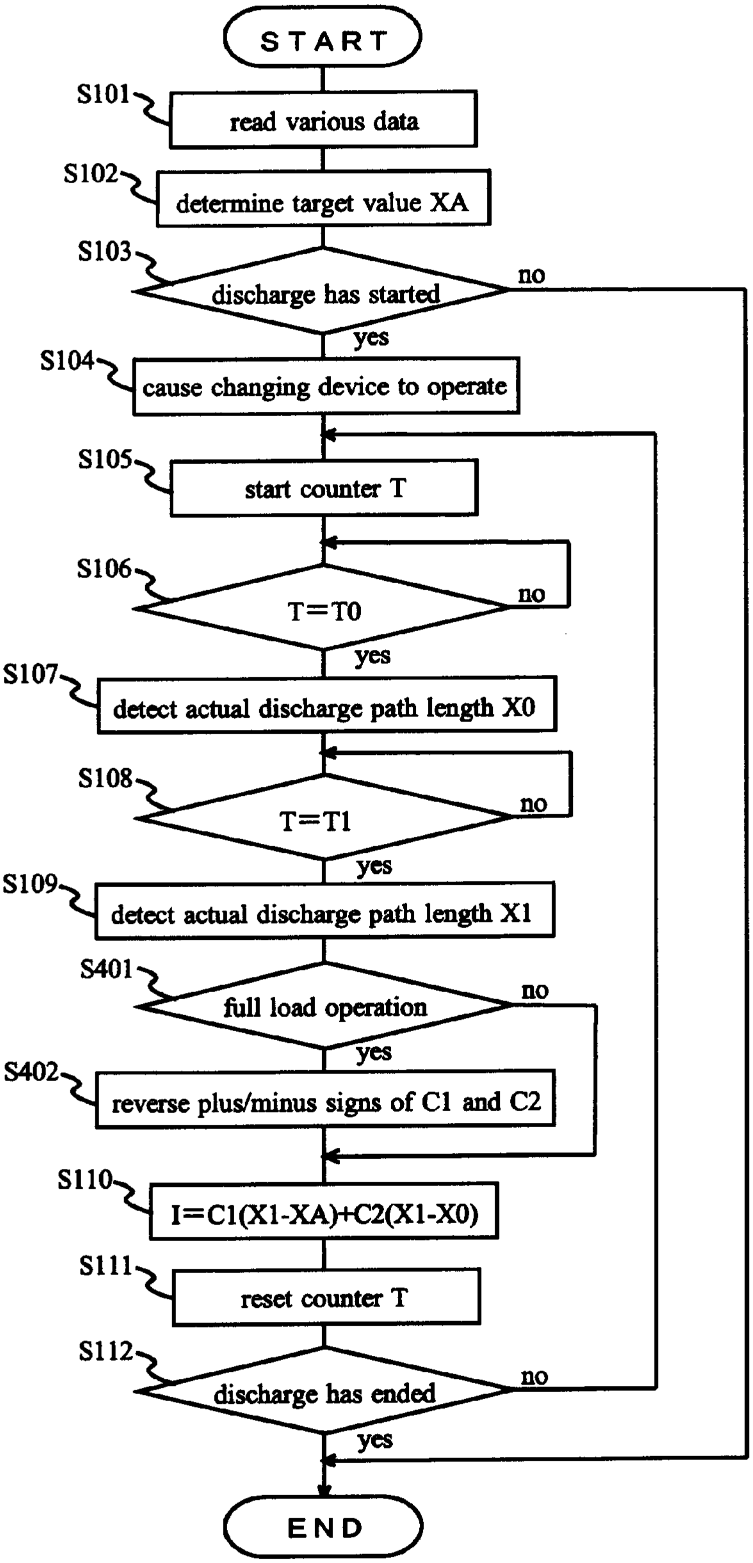
FIG. 14 is a flow chart of a discharge control routine in a fourth embodiment.

In the discharge control routine shown in FIG. 14, the ECU 50 executes the process of step S401 after executing the process of step S109. In step S401, the ECU 50 reads an output signal of the accelerator position sensor 23 (accelerator opening degree) or the opening degree of the throttle valve 18 and the engine speed and determines based on the read data whether or not the internal combustion engine 1 is in a full load operation state.

If the determination in step S401 is affirmative, the ECU 50 proceeds to step S402, and if the determination in step S401 is negative, the ECU 50 skips step S402 and proceeds to step S110. In step S402, the ECU 50 reverses the positive/negative signs of the weighting coefficients C1, C2 used in calculating the amount of excitation current I. This reverses the direction of magnetic force generated between the base end 24*c* and the tip end 24*d* of the core 24*a*. Thus, the magnetic force acts in the direction from the base end 24*c* to the tip end 24*d* of the core 24*a*. In consequence, the discharge path is extended toward the intake side.

If the determination in step S401 is negative, a magnetic force acting in the direction from the tip end 24*d* to the base end 24*c* is generated, because the process of step S402 is skipped. In consequence, the discharge path is extended toward the exhaust side.

With the execution of the discharge control routine shown in FIG. 14 by the ECU 50 as described above, knocking can be prevented from occurring during full load operations, and electric power consumption of the changing device can be reduced during non-full load operations.

Fifth Embodiment

A fifth embodiment of the present invention will be described with reference to FIGS. 15 to 17. Here, features different from the above-described third embodiment will be described, and like features will not be described.

What is different in this embodiment from the above-described third embodiment is that the direction in which the discharge path is extended and the amount of extension are changed continuously or stepwise with the travel of fuel injected from the fuel injection valve 14. When the internal combustion engine 1 is cold-started, it is necessary to activate an exhaust gas purification apparatus (such as a three-way catalyst, oxidation catalyst, or NOx catalyst) provided in the exhaust passage 17 at an early time. To this end, when the internal combustion engine 1 is cold-started, a process of raising the exhaust temperature (which will be hereinafter referred to as the "temperature raising control") may be performed by retarding the fuel injection timing to a time close to the ignition time.

When the internal combustion engine 1 is cold-started, there is a possibility that a degradation in the ignitability and/or misfire occurs because the in-cylinder pressure and the in-cylinder temperature are low. Furthermore, since the temperature raising process is executed at a time when the engine load and the engine speed are relatively low, the fuel injected by the fuel injection valve 14 is hard to be influenced by the gas flow. Therefore, the fuel injected by the fuel injection valve 14 is highly likely to travel in the fuel injection direction of the fuel injection valve 14.

In view of the above, in the discharge control in this embodiment, the ECU 50 is adapted to control the changing device 24 in such a way that the discharge path shifts with the injected fuel. In the above described case shown in FIG. 1, the fuel injection valve 14 is arranged in such a way as to inject fuel from the intake side toward the exhaust side. Consequently, the injected fuel travels from the intake side toward the exhaust side. Therefore, in the discharge control in this embodiment, the ECU 50 should control the changing device 24 in such a way that the location of the discharge path changes from the intake side toward the exhaust side continuously or stepwise.

Figure 15:
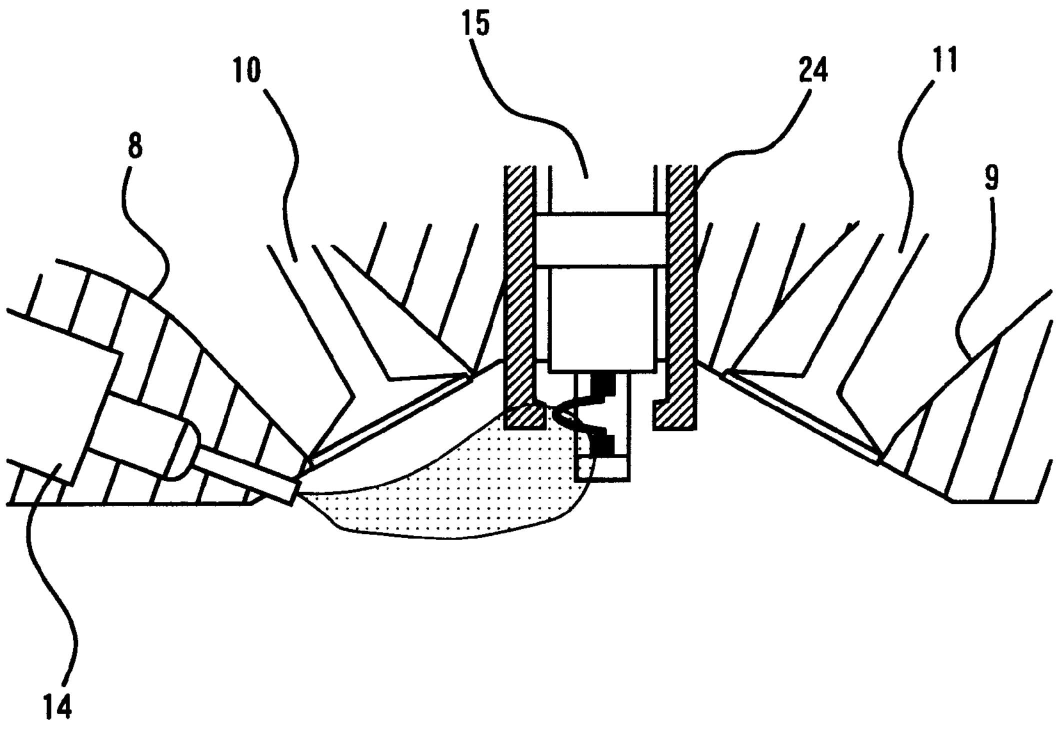
FIG. 15 is a diagram showing the relative positions of injected fuel and the discharge path in the early stage in the discharge period.
Figure 16:
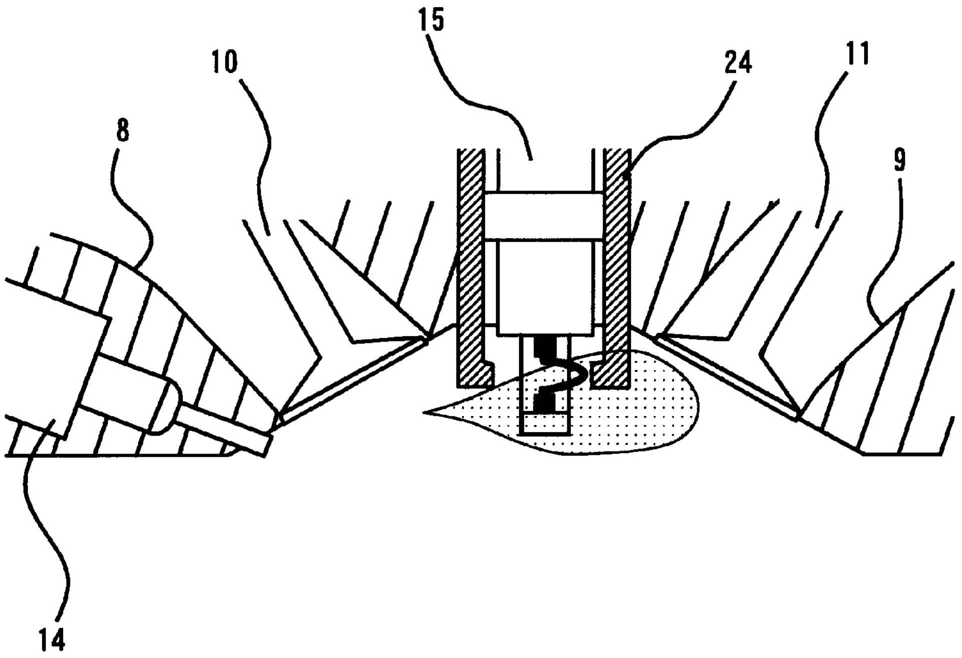
FIG. 16 is a diagram showing the relative positions of injected fuel and the discharge path in the closing stage in the discharge period.

In the early stage of the discharge period, the injected fuel is located in the intake side, as shown in FIG. 15. Therefore, the ECU 50 extends the discharge path toward the intake side in the early stage of the discharge period. Thereafter, the ECU 50 decreases the amount of excitation current I of the changing device 24 with the lapse of time, thereby gradually decreasing the amount of extension of the discharge path. As the amount of extension of the discharge path becomes zero (i.e. the amount of excitation current becomes zero), the ECU 50 reverses the direction of extension of the discharge path from the intake side to the exhaust side. After the reversal of the extension direction of the discharge path, the ECU 50 gradually increases the amount of excitation current I supplied to the changing device 24 from zero, thereby increasing the amount of extension of the discharge path. In consequence, in the closing stage of the discharge period, the discharge path is extended toward the exhaust side, as shown in FIG. 16.

The shift of the location of the discharge path with the injected fuel improves the ignitability of the injected fuel and prevents the occurrence of misfire. In consequence, the quantity of unburned fuel discharged from the cylinder 3 decreases, and the exhaust temperature becomes higher.

In the following a process of executing the discharge control in this embodiment will be described with reference to FIG. 17. FIG. 17 is a flow chart of a discharge control routine in this embodiment. The discharge control routine is stored in the ROM of the ECU 50 in advance and executed by the ECU 50 periodically.

Figure 17:
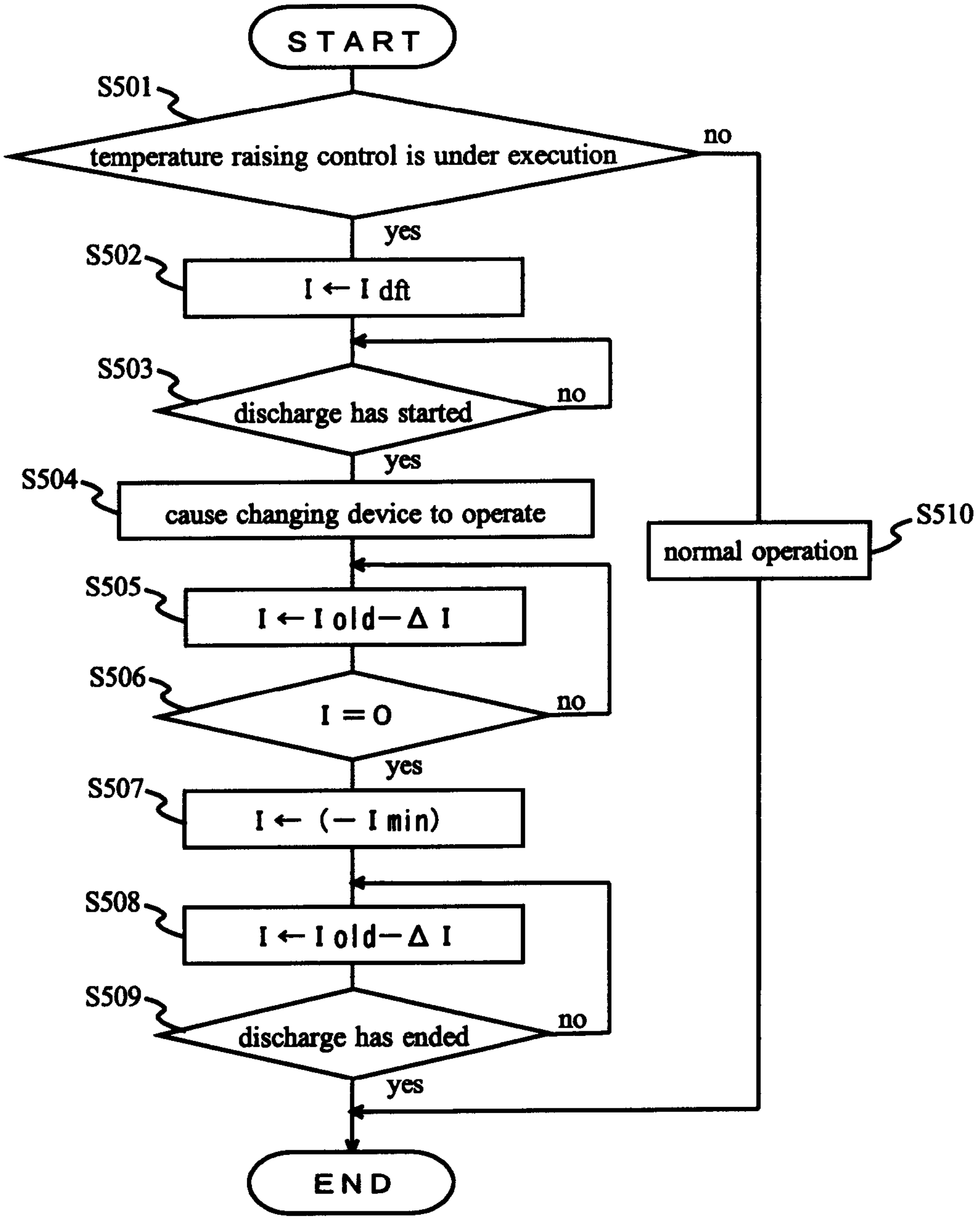
FIG. 17 is a flow chart of a discharge control routine in a fifth embodiment.

In the discharge control routine in FIG. 17, first in step S501, the ECU 50 determines whether or not the temperature raising control is under execution. If the determination in step S501 is negative, the ECU 50 proceeds to step S510, where it executes a normal control. The normal control mentioned here is, for example, the above-described discharge control according to the control routine shown in FIG. 8.

If the determination in step S501 is affirmative, the ECU 50 proceeds to step S502. In step S502, the ECU 50 sets the amount of excitation current I to an initial value Idft. The initial value Idft is an excitation current value that makes the discharge path length largest within the extent in which a discharge interruption does not occur. The initial value Idft is determined in advance by an adaptation process employing, for example, experiments. The sign (plus/minus) of the initial value Idft is set in such a way that the discharge path is extended toward the intake side.

In step S503, the ECU 50 determines whether or not the ignition plug 15 has started a spark discharge. If the determination in step S503 is negative, the ECU 50 executes the process of step S503 again. On the other hand, if the determination in step S503 is affirmative, the ECU 50 proceeds to step S504.

In step S504, the ECU 50 supplies the excitation current I set in the above step S502 to the coil 24*b*, thereby causing the changing device 24 to operate. Then, the discharge path is extended toward the intake side with the maximum amount of extension.

In step S505, the ECU 50 subtracts a predetermined amount ΔI from the present amount of excitation current Iold, thereby reducing the amount of extension of the discharge path. The predetermined amount ΔI is a value adapted to the traveling speed of the fuel injected by the fuel injection valve 14. The predetermined amount ΔI is determined in advance by an adaptation process employing, for example, experiments.

In step S506, the ECU 50 determines whether or not the amount of excitation current I obtained in the above step S505 is equal to zero (or whether or not the amount of excitation current I is smaller than ΔI). If the determination in step S506 is negative, the ECU 50 returns to step S505. As the processes of steps S505 and S506 are executed repeatedly, the amount of extension of the discharge path decreases gradually. In consequence, the location of the discharge path shifts gradually from the intake side to the neighborhood of the discharge gap.

If the determination in step S506 is affirmative, the ECU 50 proceeds to step S507, where it reverses the direction of the excitation current and changes the value of the excitation current I to a minimum value Imin (I=−Imin). The amount of the aforementioned minimum value Imin is equal to the aforementioned predetermined amount ΔI. With the above-described change in the value and direction of the excitation current I, the discharge path is extended slightly toward the exhaust side.

In step S508, the ECU 50 subtracts the predetermined amount ΔI from the present amount of excitation current I, thereby increasing the extension of the discharge path. Then, the ECU 50 proceeds to step S509, where it determines whether or not the discharge period of the ignition plug 15 has ended. If the determination in step S509 is negative, the ECU 50 returns to step S508. As the processes of steps S508 and S509 are executed repeatedly, the amount of extension of the discharge path increases gradually. In consequence, the location of the discharge path shifts gradually from the neighborhood of the discharge gap to the exhaust side. If the determination in step S509 is affirmative, the ECU 50 once terminates the execution of this routine.

With the execution of the discharge control routine shown in FIG. 17 by the ECU 50 as described above, the location of the discharge path during the execution of the temperature raising process can be adjusted to the location of the injected fuel. In consequence, the ignitability of fuel is improved, and the occurrence of misfire can be prevented. Furthermore, the quantity of fuel used in combustion increases. Consequently, the quantity of unburned fuel discharged from the cylinder 3 decreases, and the exhaust temperature becomes higher.

Sixth Embodiment

A sixth embodiment of the present invention will be described with reference to FIG. 18. Here, features different from the above-described first embodiment will be described, and like features will not be described.

What is different in this embodiment from the above-described first embodiment is that the weighting coefficients C1, C2 used in calculating the amount of excitation current I are changed in accordance with the engine speed. When the engine speed is high, the speed of the gas flowing into the cylinder 3 (inflowing speed) is higher than when the engine speed is low. Consequently, the flow speed of the gas and the changing rate of the direction of the gas flow during the discharge period are also higher. On the other hand, when the engine speed is low, the inflowing speed is lower than when the engine speed is high. In consequence, the flow speed of the gas and the changing rate of the direction of the gas flow during the discharge period are also lower.

If the ratio of weighting coefficient C2 to weighting coefficient C1 is high at a time when the flow speed of the gas and the changing rate of the direction of the gas flow during the discharge period are low, the adjustment amount for the amount of excitation current I may be unduly small in some cases. In such cases, there is a possibility that it takes time for the actual discharge path length to converge to the target value XA.

On the other hand, if the ratio of weighting coefficient C2 to weighting coefficient C1 is low at a time when the flow speed of the gas and the changing rate of the direction of the gas flow during the discharge period are high, the adjustment amount for the amount of excitation current I may be unduly large in some cases. In such cases, an overshoot or undershoot of the actual discharge path length with respect to the target value XA tends to occur.

In view of the above, in the discharge control in this embodiment, the ECU 50 is adapted to correct at least one of weighting coefficients C1 and C2 in such a way that the ratio of weighting coefficient C2 to weighting coefficient C1 is made higher when the engine speed is high than when the engine speed is low.

In the following, a process of executing the discharge control in this embodiment will be described with reference to FIG. 18. FIG. 18 is a flow chart of a discharge control routine in this embodiment. In FIG. 18, the processes same as those in the discharge control routine in the above-described first embodiment (see FIG. 8) are denoted by the same reference symbols.

Figure 18:
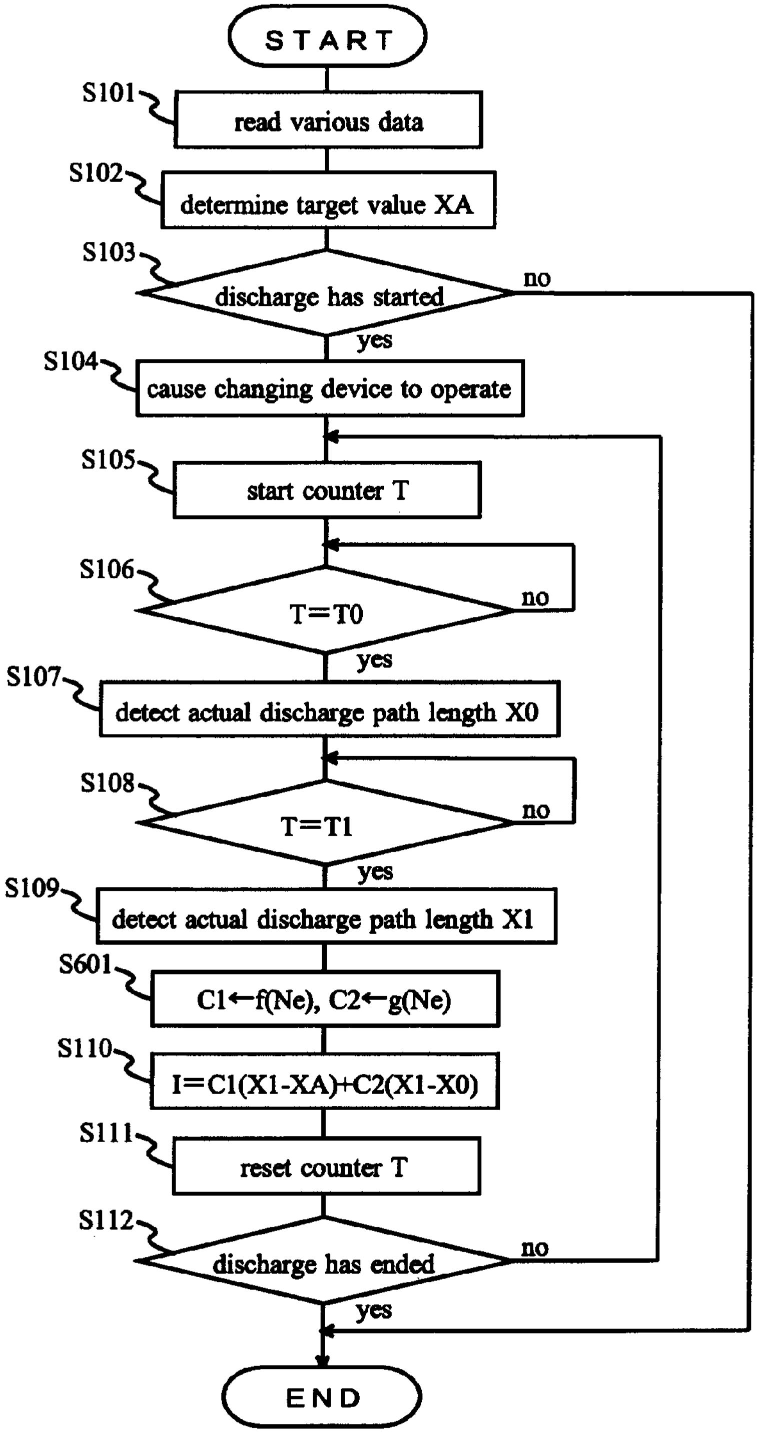
FIG. 18 is a flow chart of a discharge control routine in a sixth embodiment.

In the discharge control routine in FIG. 18, the ECU 50 executes the process of step S601 after executing the process of step S109. In step S601, the ECU 50 calculates the weighting coefficients C1, C2 according to functions f(Ne) and g(Ne) having as a parameter the engine speed Ne. Here, function f(Ne) is set in such a way that the higher the engine speed Ne is, the smaller the weighting coefficient C1 is. Function g(Ne) is set in such a way that the higher the engine speed Ne is, the larger the weighting coefficient C2 is.

The ECU 50 executes the process of step S110 after executing the process of step S601. In step S110, the ECU 50 calculates the amount of excitation current I using the weighting coefficients C1, C2 obtained in the above step S601 (I=C1(X1−XA)+C2(X1−X0)).

With the execution of the discharge control routine shown in FIG. 18 by the ECU 50 as described above, the actual discharge path length is caused to converge quickly to the target value irrespective of the engine speed.

Although this embodiment is directed to a case in which the ratio of weighting coefficient C2 to weighting coefficient C1 is changed continuously in accordance with the engine speed, it may be changed stepwise. For example, the range of possible engine speed of the internal combustion engine 1 may be divided into a plurality of ranges, and weighting coefficients C1 and C2 may be changed in accordance with the range in which the engine speed falls. If this is the case, weighting coefficients C1 and C2 should be changed in such a way that the ratio of weighting coefficient C2 to weighting coefficient C1 is made higher when the engine speed falls in a higher speed range than when the engine speed falls in a lower speed range.

Seventh Embodiment

Figure 19:
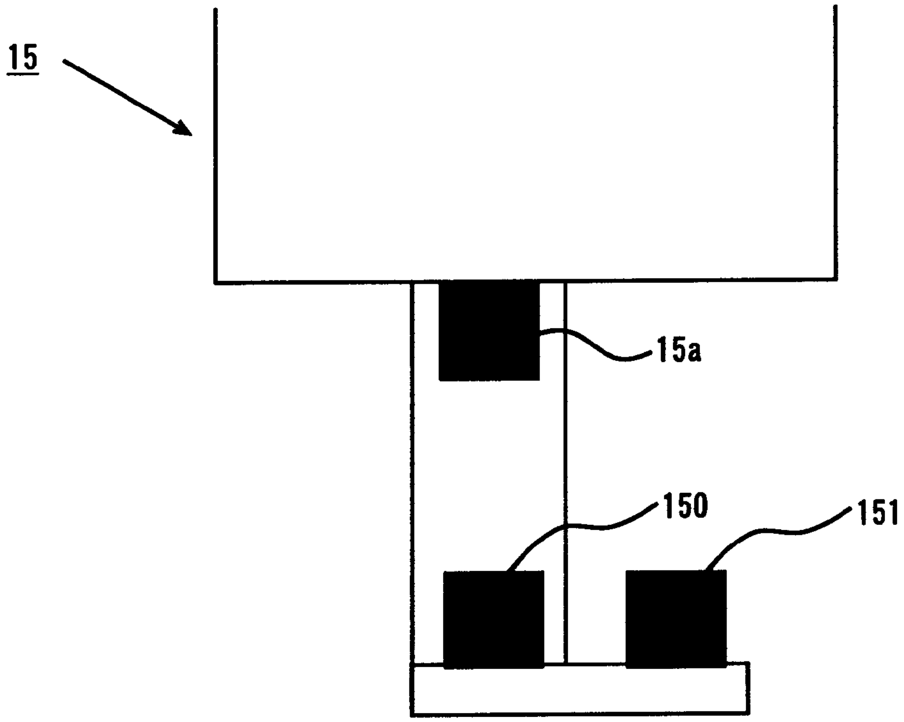
FIG. 19 is a front view showing the structure of the tip end portion of an ignition plug in a seventh embodiment.
Figure 20:
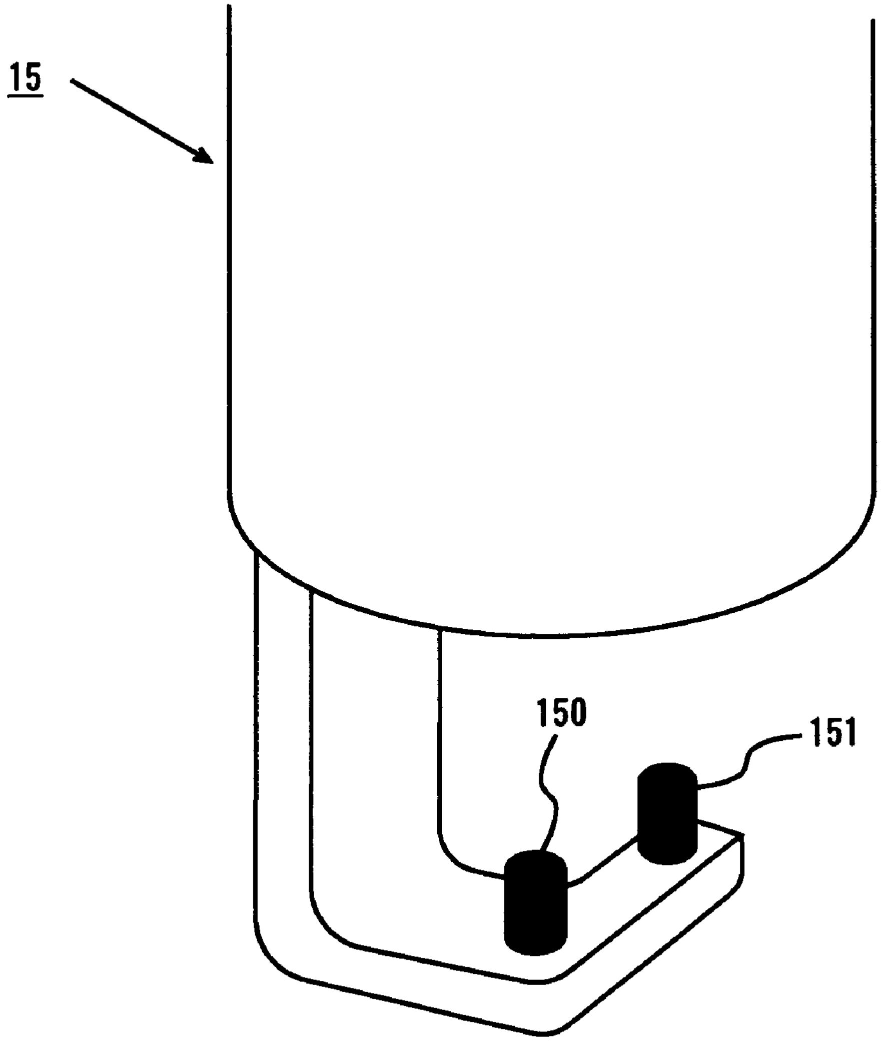
FIG. 20 is a perspective view showing the tip end portion of the ignition plug in the seventh embodiment.

A seventh embodiment of the present invention will be described with reference to FIGS. 19 to 21. Here, features different from the above-described first embodiment will be described, and like features will not be described.

What is different in this embodiment from the above-described first embodiment is that the ignition plug 15 has a plurality of ground electrodes. As shown in FIGS. 19 and 20, the ignition plug 15 according to this embodiment has two ground electrodes 150, 151 having different distances from the center electrode 15*a*. In the following, the ground electrode 150 that is closer to the center electrode 15*a* will be referred to as the first ground electrode 150, and the ground electrode 151 that is farther from the center electrode 15*a* will be referred to as the second ground electrode 151.

Figure 21:
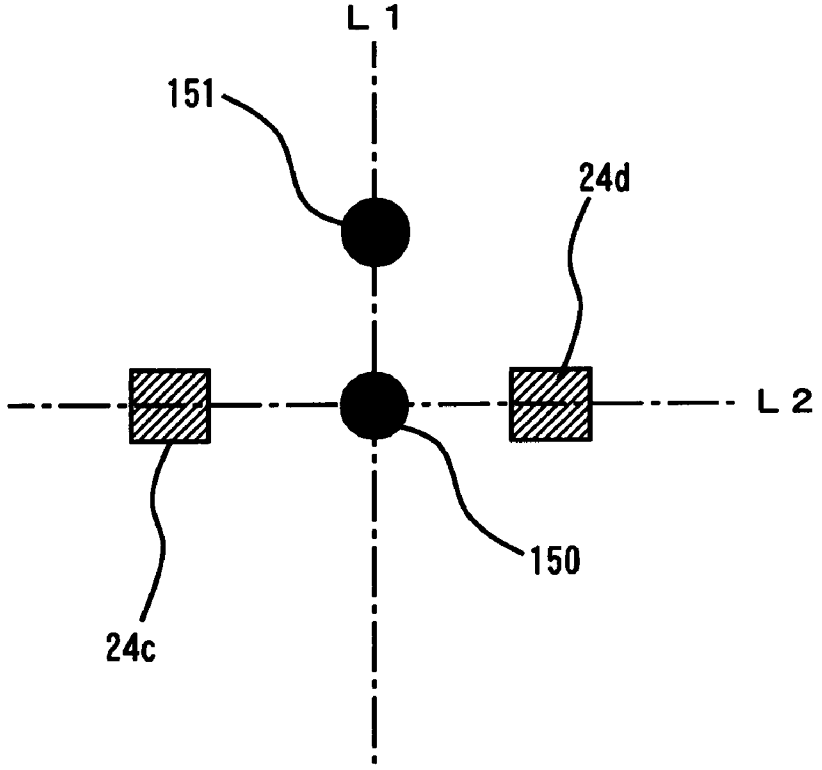
FIG. 21 is a diagram showing an exemplary arrangement of a first ground electrode and a second ground electrode.

As shown in FIG. 21, the first ground electrode 150 and the second ground electrode 151 are arranged in such a way that a virtual straight line L1 connecting the first ground electrode 150 and the second ground electrode 151 intersects with a virtual straight line L2 connecting the base end 14*c* and the tip end 24*d* of the core 24*a* at a right angle.

With the above configuration, at the time when the ignition plug 15 starts a spark discharge, the spark discharge is grounded to the first ground electrode 150. When the discharge path is extended to the neighborhood of the second ground electrode 151 by the changing device 24 thereafter, the ground location of the spark discharge changes from the first ground electrode 150 to the second ground electrode 151.

Such changing of the discharge path length utilizing a plurality of ground electrodes can reduce the amount of wear of each of the ground electrodes 150, 151. After the ground location of the spark discharge has changed to the second ground electrode 151, the amount of excitation current that is required to maintain the discharge path length by the changing device 14 can be decreased.

Therefore, in this embodiment, the durability of the ignition plug 15 can be enhanced, and the power consumption of the changing device 24 can be decreased.

Eighth Embodiment

Figure 22:
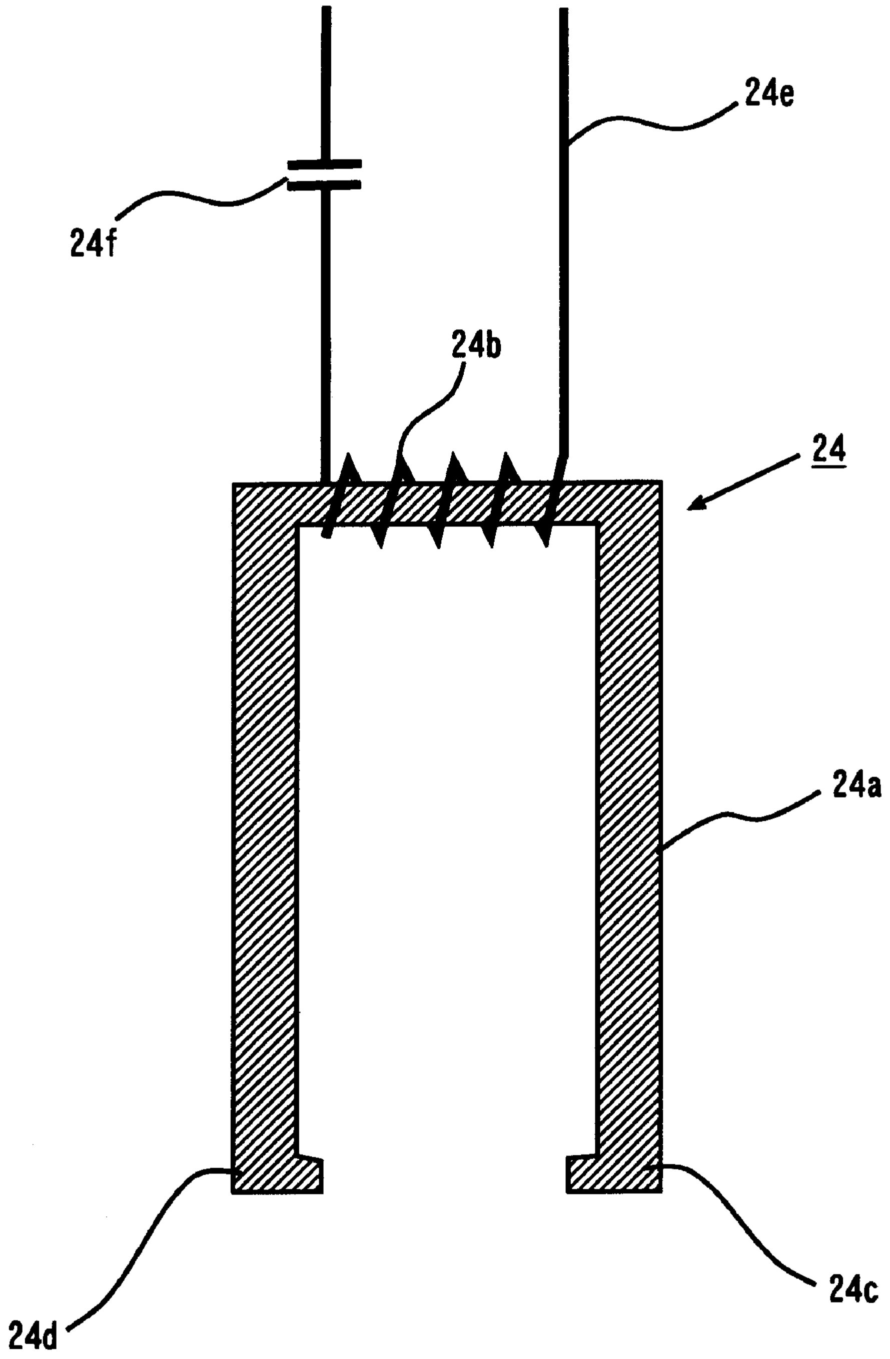
FIG. 22 is a diagram schematically showing the structure of a changing device according to a eighth embodiment.

An eighth embodiment of the present invention will be described with reference to FIG. 22. Here, features different from the above-described first embodiment will be described, and like features will not be described.

What is different in this embodiment from the above-described first embodiment is that a capacitor is provided in the excitation current path in the changing device 24. Specifically, as shown in FIG. 22, a capacitor 24*f* is provided in the middle of the power supply line 24*e* for supplying the excitation current to the coil 24*b*.

If the actual discharge path length changes due to, for example, a gas flow at a time when the excitation current is not supplied to the coil 24*b* or when the changing device 24 is in a non-energized state, a current will be generated in the coil 24*b* by electromagnetic induction. Then, if the capacitor 24*f* is provided in the power supply line 24*e* for the coil 24*b*, the electrical energy generated in the coil 24*b* is stored in the capacitor 24*f*.

The electrical energy thus stored in the capacitor 24*f* can be used when excitation the changing device 24. Consequently, the power consumption of the changing mechanism 24 can be reduced. The design of this embodiment can be used in combination with the designs of the above-described second to seventh embodiments.

Although the above-described first to eighth embodiments are directed to an internal combustion engine equipped with a fuel injection valve 14 that injects fuel directly into the cylinder 3, the designs of the embodiments other than the fifth embodiment can be applied to an internal combustion engine equipped with a fuel injection valve that injects fuel into an intake port of the internal combustion engine.

The above-described designs of the first to eighth embodiments can be adopted in combination where feasible.

DESCRIPTION OF THE REFERENCE NUMERALS AND SYMBOLS

1: internal combustion engine
2: cylinder block
3: cylinder
4: piston
5: connecting rod
6: crankshaft
7: cylinder head
8: intake port
9: exhaust port
10: intake valve
11: exhaust valve
12: intake cam
13: exhaust cam
14: fuel injection valve
15: ignition plug
15*a*: center electrode
15*b*: ground electrode
16: intake passage
17: exhaust passage
18: throttle valve
19: EGR passage
20: EGR valve
21: crank position sensor
22: air flow meter
23: accelerator position sensor
24: changing device
24*a*: core
24*b*: coil
24*c*: base end
24*d*: tip end
24*e*: power supply line
24*f*: capacitor
150: ground electrode
151: ground electrode

The invention claimed is:

1. An ignition control system for an internal combustion engine comprising:

an ignition plug having a center electrode and a ground electrode disposed in a cylinder of an internal combustion engine;

a changing device that changes a discharge path length, which is the path length of a spark discharge that occurs between said center electrode and said ground electrode;

detection unit for detecting an actual discharge path length, which is the path length of a spark discharge that actually occurs between said center electrode and said ground electrode; and control unit for controlling said changing device in such a way that the actual discharge path length detected by said detection unit converges to a target value.

2. An ignition control system for an internal combustion engine according to claim 1, further comprising correction unit for correcting said target value in such a way that said target value is made smaller when a quantity of fuel existing in the cylinder is small than when the quantity of fuel existing in the cylinder is large.

3. An ignition control system for an internal combustion engine according to claim 1, further comprising correction unit for correcting said target value in such a way that said target value is made smaller when a quantity of EGR gas existing in the cylinder is large than when the quantity of EGR gas existing in the cylinder is small.

4. An ignition control system for an internal combustion engine according to claim 1, wherein:

said changing device is a device that can change the discharge path length and the direction in which the discharge path is extended; and when the internal combustion engine is not in a full load operation state, said control unit controls said changing device in such a way that the discharge path is extended in a direction of gas flow in the cylinder, and when the internal combustion engine is in a full load operation state, said control unit controls said changing device in such a way that a discharge path is extended in a direction opposite to the direction of gas flow in the cylinder.

5. An ignition control system for an internal combustion engine according to claim 1, wherein:

said ignition plug has a plurality of ground electrodes having different distances from said center electrode; and said changing device is adapted to be able to change the discharge path length along a direction in which said plurality of ground electrodes are arranged.

6. An ignition control system for an internal combustion engine according to claim 1, further comprising correction unit for correcting said target value using as parameters a discharge current and a discharge voltage at a time when said ignition plug starts the discharge.

7. An ignition control system for an internal combustion engine according to claim 6, wherein:

said detection unit comprises a first detection section that detects the actual discharge path length and a second detection section that detects an amount of change in the actual discharge path length; and said control unit determines a control value for said changing device using as parameters a difference between the actual discharge path length detected by said first detection section and the target value and the amount of change detected by said second detection section.

8. An ignition control system for an internal combustion engine according to claim 1, wherein:

said detection unit comprises a first detection section that detects the actual discharge path length and a second detection section that detects an amount of change in the actual discharge path length; and said control unit determines a control value for said changing device using as parameters a difference between the actual discharge path length detected by said first detection section and the target value and the amount of change detected by said second detection section.

9. An ignition control system for an internal combustion engine according to claim 8, wherein in determining a control value for said changing device, said control unit increases weighting of the amount of change detected by said second detection section when engine speed is high as compared to when the engine speed is low.

10. An ignition control system for an internal combustion engine according to claim 1, wherein:

said changing device is a device that can change the discharge path length and a direction in which the discharge path is extended; and said control unit controls said changing device in such a way that the direction in which the discharge path is extended is changed during a discharge period of said ignition plug.

11. An ignition control system for an internal combustion engine according to claim 10, wherein:

said internal combustion engine has a fuel injection valve that injects fuel into the cylinder; and said control unit controls said changing device in such a way that the direction in which the discharge path is extended and an amount of extension of the discharge path are changed along a direction in which fuel injected by said fuel injection valve travels.

12. An ignition control system for an internal combustion engine according to claim 1, wherein:

said changing device is an electromagnet that generates a magnetic field in a space between said center electrode and said ground electrode when an excitation current is supplied to it; and said control unit changes the actual discharge path length by changing an amount of excitation current supplied to said electromagnet.

13. An ignition control system for an internal combustion engine according to claim 12, wherein electric potential of said electromagnet is made higher than electric potential of said ground electrode.

14. An ignition control system for an internal combustion engine according to claim 12, wherein a capacitor for storing electrical energy is provided in a middle of a line for supplying the excitation current to said electromagnet.

* * * * *